(12) United States Patent
Damnjanovic et al.

(10) Patent No.: US 11,611,985 B2
(45) Date of Patent: Mar. 21, 2023

(54) GRANT OF RESOURCES FOR DOWNLINK AND UPLINK COMMUNICATION VIA ONE OR MORE RELAY USER EQUIPMENT

(71) Applicant: QUALCOMM Incorporated, San Diego, CA (US)

(72) Inventors: Jelena Damnjanovic, Del Mar, CA (US); Tao Luo, San Diego, CA (US); Sony Akkarakaran, Poway, CA (US); Aleksandar Damnjanovic, Del Mar, CA (US); Juan Montojo, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/203,390

(22) Filed: Mar. 16, 2021

(65) Prior Publication Data

US 2021/0298066 A1 Sep. 23, 2021

Related U.S. Application Data

(60) Provisional application No. 62/992,884, filed on Mar. 20, 2020, provisional application No. 62/991,502, filed on Mar. 18, 2020.

(51) Int. Cl.
*H04W 72/14* (2009.01)
*H04W 40/22* (2009.01)
*H04W 72/04* (2023.01)

(52) U.S. Cl.
CPC .......... *H04W 72/14* (2013.01); *H04W 40/22* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 11,337,107 B2* | 5/2022 | Saiwai | H04W 72/042 |
| 11,337,271 B2* | 5/2022 | Sharma | H04W 76/27 |
| 2017/0196020 A1* | 7/2017 | Mukherjee | H04W 74/006 |
| 2017/0230941 A1* | 8/2017 | Agiwal | H04W 72/04 |
| 2018/0206176 A1* | 7/2018 | Panteleev | H04W 72/1231 |
| 2018/0324848 A1* | 11/2018 | Baghel | H04L 5/0053 |
| 2019/0052419 A1* | 2/2019 | Yang | H04W 72/1278 |
| 2019/0208539 A1* | 7/2019 | Christoffersson | H04W 88/04 |
| 2019/0306912 A1* | 10/2019 | Cheng | H04W 76/11 |
| 2020/0028718 A1* | 1/2020 | Wang | H04L 25/0226 |
| 2020/0029318 A1* | 1/2020 | Guo | H04L 1/1819 |
| 2020/0092685 A1* | 3/2020 | Fehrenbach | H04W 4/46 |

(Continued)

*Primary Examiner* — Kenny S Lin
(74) *Attorney, Agent, or Firm* — Loza & Loza, LLP

(57) ABSTRACT

A data pipeline between a base station and a user equipment (UE) may be formed via a relay UE. In this regard, a base station is configured to send a joint grant to the first UE, the joint grant including a first resource assignment for transmission of data via a first communication link between the base station and the first UE, and a second resource assignment for transmission of data via a second communication link between the first UE and a second UE. The first and second communications link may form a downlink pipeline for transmitting data from the base station to the UE. The first and second communications link may be used to transmit uplink data in parallel from the first UE to the base station.

28 Claims, 20 Drawing Sheets

(56) References Cited

U.S. PATENT DOCUMENTS

| | | | | |
|---|---|---|---|---|
| 2020/0146032 A1* | 5/2020 | Bae | ...................... | H04W 80/08 |
| 2021/0136740 A1* | 5/2021 | Xue | ...................... | H04W 72/02 |
| 2021/0345319 A1* | 11/2021 | Blankenship | ..... | H04W 72/0413 |
| 2022/0132556 A1* | 4/2022 | Alabbasi | ............... | H04L 1/1812 |

* cited by examiner

GRANT OF RESOURCES FOR DOWNLINK AND UPLINK COMMUNICATION VIA ONE OR MORE RELAY USER EQUIPMENT

CROSS-REFERENCE TO RELATED APPLICATIONS

This application claims the benefit of the filing dates of U.S. Provisional Application, Ser. No. 62/991,502, filed on Mar. 18, 2020, and U.S. Provisional Application, Ser. No. 62/992,884, filed on Mar. 20, 2020, both of which are incorporated herein by reference.

TECHNICAL FIELD

The technology discussed below relates generally to wireless communication systems or networks, and more particularly, to relay wireless communication for downlink data transmission and/or uplink data transmission via one or more relay user equipment (UE).

Introduction

In many existing wireless communication systems, a cellular network is implemented by enabling wireless user equipment to communicate with one another through signaling with a nearby base station or cell. As a user equipment (UE) moves across the service area, handovers take place such that each UE maintains communication with one another via its respective cell.

Another scheme for a wireless communication system is a device-to-device (D2D) network, in which UEs may signal one another directly, rather than via an intermediary base station or cell. D2D communication networks may utilize direct signaling (e.g., sidelink signaling) to facilitate direct communication between UEs. In some D2D configurations, UEs may further communicate in a cellular system, generally under the control of a base station. Thus, the UEs may be configured for uplink and downlink signaling via a base station and further for sidelink signaling directly between the UEs without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

An example provides a base station. The base station includes a processor; a wireless transceiver communicatively coupled to the processor; and a memory communicatively coupled to the processor, wherein the processor and the memory are configured to: generate a joint grant comprising a first resource assignment for transmission of data via a first communication link between the base station and a first user equipment (UE), and a second resource assignment for transmission of data via a second communication link between the first UE and a second UE; and transmit the joint grant to the first UE via the wireless transceiver.

Another example provides a method for wireless communication at a base station. The method includes generating a joint grant including a first resource assignment for transmission of data via a first communication link between the base station and a first user equipment (UE), and a second resource assignment for transmission of data via a second communication link between the first UE and a second UE; and transmitting the joint grant to the first UE.

Another example provides an apparatus for wireless communication at a base station. Means for generating a joint grant including a first resource assignment for transmission of data via a first communication link between the base station and a first user equipment (UE), and a second resource assignment for transmission of data via a second communication link between the first UE and a second UE; and means for transmitting the joint grant to the first UE.

Another example provides a non-transitory computer-readable medium storing code for wireless communication at a base station. The code may include instructions executable by a processor to generate a joint grant including a first resource assignment for transmission of data via a first communication link between the base station and a first user equipment (UE), and a second resource assignment for transmission of data via a second communication link between the first UE and a second UE; and transmit the joint grant to the first UE.

Another example provides a first user equipment (UE). The first UE includes a processor; a wireless transceiver communicatively coupled to the processor; and a memory communicatively coupled to the processor, wherein the processor and the memory are configured to: receive a joint grant from a base station via the wireless transceiver, the joint grant including a first resource assignment for transmission of data via a first communication link between the first UE and the base station, and a second resource assignment for transmission of data via a second communication link between the first UE and a second UE; receive or transmit data via the first communication link and the wireless transceiver based on the joint grant; and transmit data via the second communication link and the wireless transceiver based on the joint grant.

Another example provides a method for wireless communication at a first user equipment (UE). The method includes receiving a joint grant from a base station, the joint grant including a first resource assignment for transmission of data via a first communication link between the first UE and the base station, and a second resource assignment for transmission of data via a second communication link between the first UE and a second UE; receiving or transmitting data via the first communication link based on the joint grant; and transmitting data via the second communication link based on the joint grant.

Another example provides an apparatus for wireless communication at a first user equipment (UE). The apparatus includes means for receiving a joint grant from a base station, the joint grant including a first resource assignment for transmission of data via a first communication link between the first UE and the base station, and a second resource assignment for transmission of data via a second communication link between the first UE and a second UE; means for receiving or transmitting data via the first communication link based on the joint grant; and means for transmitting data via the second communication link based on the joint grant.

Another example provides a non-transitory computer-readable medium storing code for wireless communication at a first user equipment (UE). The code may include instructions executable by a processor to receive a joint grant from a base station, the joint grant including a first resource assignment for transmission of data via a first communication link between the first UE and the base station, and a second resource assignment for transmission of data via a second communication link between the first UE and a second UE; receive or transmit data via the first communication link based on the joint grant; and transmit data via the second communication link based on the joint grant.

Another example provides a base station. The base station includes a processor; a wireless transceiver communicatively coupled to the processor; and a memory communicatively coupled to the processor, wherein the processor and the memory are configured to: generate a joint grant including a first resource assignment for transmitting downlink data to a relay user equipment via a first communication link between the base station and the relay UE, and a second resource assignment for transmitting the downlink data to a user equipment (UE) via a second communication link between the relay UE and the UE, wherein the first and second communications links form a pipeline for transmitting the downlink data from the base station to the UE; and transmit the joint grant to the relay UE via the wireless transceiver.

Another example provides a method for wireless communication at a base station. The method includes generating a joint grant including a first resource assignment for transmitting downlink data to a relay user equipment (UE) via a first communication link between the base station and the relay UE, and a second resource assignment for transmitting the downlink data via a second communication link between the relay UE and a user equipment (UE), wherein the first and second communications links form a pipeline for transmitting the downlink data from the base station to the UE; and transmitting the joint grant to the relay UE.

Another example provides an apparatus for wireless communication at a base station. The apparatus includes means for generating a joint grant including a first resource assignment for transmitting downlink data to a relay user equipment (UE) via a first communication link between the base station and the relay UE, and a second resource assignment for transmitting the downlink data to a user equipment (UE) via a second communication link between the relay UE and the UE, wherein the first and second communications links form a pipeline for transmitting the downlink data from the base station to the UE; and means for transmitting the joint grant to the relay UE.

Another example provides a non-transitory computer-readable medium storing code for wireless communication at a base station. The code may include instructions executable by a processor to generate a joint grant including a first resource assignment for transmitting downlink data to a relay user equipment (UE) via a first communication link between the base station and the relay UE, and a second resource assignment for transmitting the downlink data to a user equipment (UE) via a second communication link between the relay UE and the UE, wherein the first and second communications links form a pipeline for transmitting the downlink data from the base station to the UE; and transmit the joint grant to the relay UE.

Another example provides a relay user equipment (UE). The relay UE includes a processor; a wireless transceiver communicatively coupled to the processor; and a memory communicatively coupled to the processor, wherein the processor and the memory are configured to: receive a joint grant from a base station via the wireless transceiver, the joint grant including a first resource assignment for reception of downlink data via a first communication link between the base station and the relay UE, and a second resource assignment for transmission of the downlink data via a second communication link between the relay UE and a user equipment (UE), wherein the first and second communication links form a pipeline for transmitting the downlink data from the base station to the UE; receive the downlink data via the first communication link based on the joint grant; and transmit the downlink data via the second communication link based on the joint grant.

Another example provides a method for wireless communication at a relay user equipment (UE). The method includes receiving a joint grant from a base station, the joint grant including a first resource assignment for receiving downlink data via a first communication link between the base station and the relay UE, and a second resource assignment for transmitting the downlink data via a second communication link between the relay UE and a user equipment (UE), wherein the first and second communication links form a pipeline for transmitting the downlink data from the base station to the UE; receiving the downlink data via the first communication link based on the joint grant; and transmitting the downlink data via the second communication link based on the joint grant.

Another example provides an apparatus for wireless communication at a relay user equipment (UE). The apparatus includes means for receiving a joint grant from a base station, the joint grant including a first resource assignment for receiving downlink data via a first communication link between the base station and the relay UE, and a second resource assignment for transmitting the downlink data via a second communication link between the relay UE and a user equipment (UE), wherein the first and second communication links form a pipeline for transmitting the downlink data from the base station to the UE; means for receiving the downlink data from the base station via the first communication link based on the joint grant; and means for transmitting the downlink data to the UE via the second communication link based on the joint grant.

Another example provides a non-transitory computer-readable medium storing code for wireless communication at a relay user equipment (UE). The code may include instructions executable by a processor to generate a joint grant including a first resource assignment for receiving downlink data via a first communication link between the base station and the relay UE, and a second resource assignment for transmitting the downlink data to a user equipment (UE) via a second communication link between the relay UE and the UE, wherein the first and second communications links form a pipeline for transmitting the downlink data from the base station to the UE; receive the downlink data from the base station via the first communication link based on the joint grant; and transmit the downlink data to the UE via the second communication link based on the joint grant.

Another example provides a method of wireless communication at a user equipment (UE). The method includes receiving, from a base station, a joint grant including an uplink grant and a sidelink grant for the UE, where the uplink grant indicates a first set of resources allocated for an uplink signal from the UE to the base station and the sidelink grant indicates a second set of resources allocated for a sidelink signal from the UE to a relay UE in communication with the UE, transmitting, based on the joint grant, the uplink signal to the base station via the first set of resources allocated for the uplink signal, and transmitting, based on the joint grant, the sidelink signal to the relay UE via the second set of resources allocated for the sidelink signal.

Another example provides an apparatus for wireless communication at a user equipment (UE). The apparatus includes a processor, a memory coupled with the processor, and instructions stored in the memory. The instructions may be executable by the processor to cause the apparatus to receive, from a base station, a joint grant including an uplink grant and a sidelink grant for the UE, where the uplink grant indicates a first set of resources allocated for an uplink signal from the UE to the base station and the sidelink grant indicates a second set of resources allocated for a sidelink signal from the UE to a relay UE in communication with the UE, transmit, based on the joint grant, the uplink signal to the base station via the first set of resources allocated for the uplink signal, and transmit, based on the joint grant, the sidelink signal to the relay UE via the second set of resources allocated for the sidelink signal.

Another example provides an apparatus for wireless communication at a user equipment (UE). The apparatus includes means for receiving, from a base station, a joint grant including an uplink grant and a sidelink grant for the UE, where the uplink grant indicates a first set of resources allocated for an uplink signal from the UE to the base station and the sidelink grant indicates a second set of resources allocated for a sidelink signal from the UE to a relay UE in communication with the UE, transmitting, based on the joint grant, the uplink signal to the base station via the first set of resources allocated for the uplink signal, and transmitting, based on the joint grant, the sidelink signal to the relay UE via the second set of resources allocated for the sidelink signal.

Another example provides a non-transitory computer-readable medium storing code for wireless communication at a user equipment (UE). The code includes instructions executable by a processor to receive, from a base station, a joint grant including an uplink grant and a sidelink grant for the UE, where the uplink grant indicates a first set of resources allocated for an uplink signal from the UE to the base station and the sidelink grant indicates a second set of resources allocated for a sidelink signal from the UE to a relay UE in communication with the UE; transmit, based on the joint grant, the uplink signal to the base station via the first set of resources allocated for the uplink signal; and transmit, based on the joint grant, the sidelink signal to the relay UE via the second set of resources allocated for the sidelink signal.

Another example provides a method of wireless communication at a base station. The method includes allocating a first set of resources for an uplink signal from a user equipment (UE) to the base station, allocating a second set of resources for a sidelink signal from the UE to a relay UE in communication with the UE; transmitting, to the UE, a joint grant including an uplink grant and a sidelink grant for the UE, the uplink grant indicating the first set of resources allocated for the uplink signal and the sidelink grant indicating the second set of resources allocated for the sidelink signal, and receiving, from the UE, the uplink signal via the first set of resources.

Another example provides an apparatus for wireless communication at a base station. The apparatus includes a processor, a memory coupled with the processor, and instructions stored in the memory. The instructions may be executable by the processor to cause the apparatus to allocate a first set of resources for an uplink signal from a user equipment (UE) to the base station, allocate a second set of resources for a sidelink signal from the UE to a relay UE in communication with the UE; transmit, to the UE, a joint grant including an uplink grant and a sidelink grant for the UE, the uplink grant indicating the first set of resources allocated for the uplink signal and the sidelink grant indicating the second set of resources allocated for the sidelink signal; and receive, from the UE, the uplink signal via the first set of resources.

Another example provides an apparatus for wireless communication at a base station. The apparatus includes means for allocating a first set of resources for an uplink signal from a user equipment (UE) to the base station, allocating a second set of resources for a sidelink signal from the UE to a relay UE in communication with the UE; transmitting, to the UE, a joint grant including an uplink grant and a sidelink grant for the UE, the uplink grant indicating the first set of resources allocated for the uplink signal and the sidelink grant indicating the second set of resources allocated for the sidelink signal; and receiving, from the UE, the uplink signal via the first set of resources.

Another example provides a non-transitory computer-readable medium storing code for wireless communication at a base station. The code includes instructions executable by a processor to allocate a first set of resources for an uplink signal from a user equipment (UE) to the base station, allocate a second set of resources for a sidelink signal from the UE to a relay UE in communication with the UE; transmit, to the UE, a joint grant including an uplink grant and a sidelink grant for the UE, the uplink grant indicating the first set of resources allocated for the uplink signal and the sidelink grant indicating the second set of resources allocated for the sidelink signal; and receive, from the UE, the uplink signal via the first set of resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
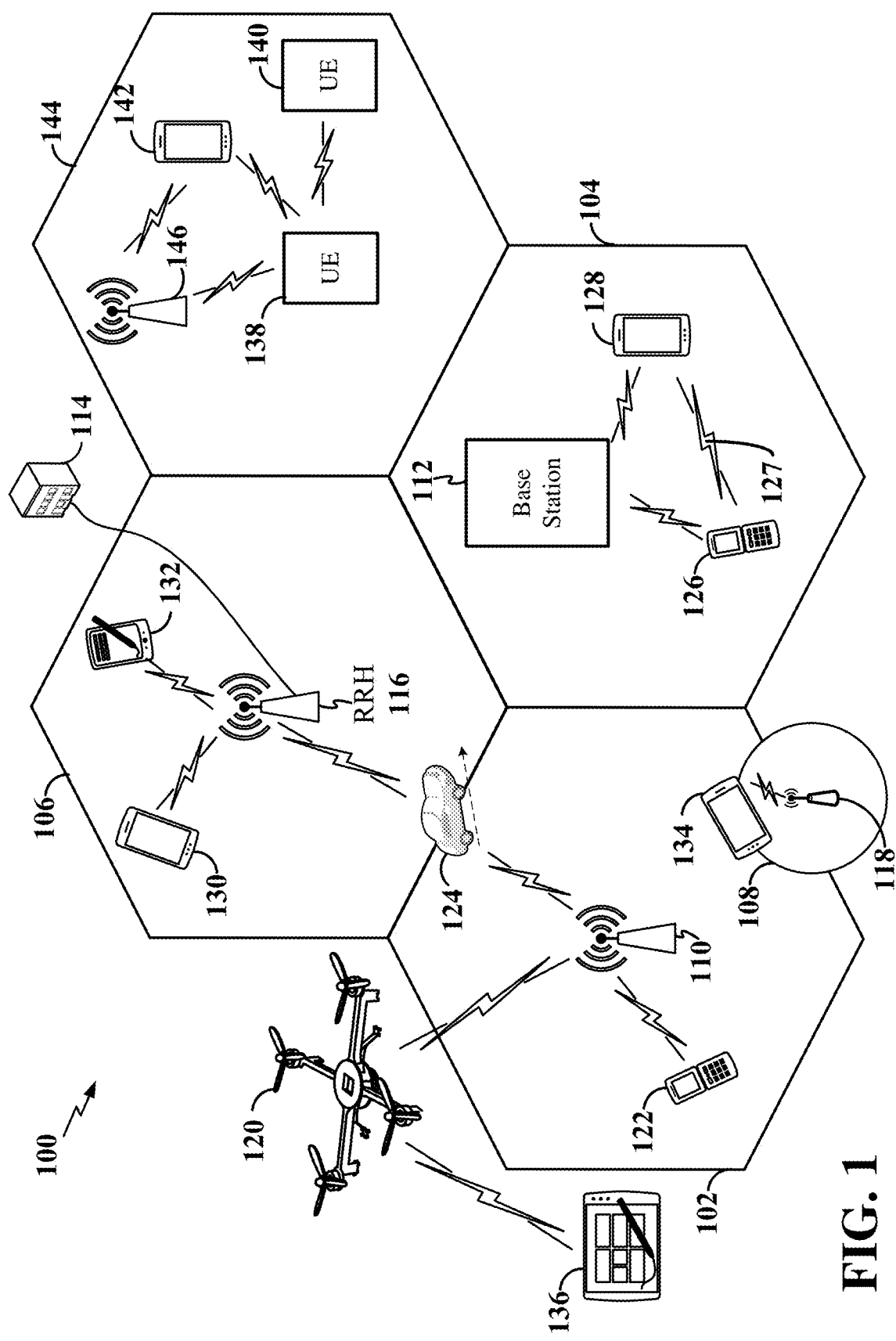
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 (e.g., a wireless communication system) is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio or communication link within a sector can be identified by a single logical identification belonging to that sector. In a cell that is divided into sectors, the multiple sectors within a cell can be formed by groups of antennas, with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104, respectively; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.), which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node or UE may be deployed to extend the size or coverage area of a given cell, as well as provide diversity and/or aggregated communication links between a base station and a UE. The base stations 110, 112, 114, and 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown); and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as a user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc.

A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmission. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells.

Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In this example, sidelink or other type of direct link signals may be communicated directly between UEs without relying on scheduling or control information from another entity, such as a base station. For example, UE 138 is illustrated communicating with UEs 140 and 142. In some examples, the UE 138 is functioning as a scheduling entity, while UEs 140 and 142 may function as scheduled entities. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity 138.

In other examples, two or more UEs (e.g., UEs 126 and 128) within the coverage area of a serving base station 112 may communicate with both the base station 112 using cellular signals and with each other using direct link (e.g., sidelink) signals 127 without relaying that communication through the base station. In an example of a V2X network within the coverage area of the base station 112, the base station 112 and/or one or both of the UEs 126 and 128 may function as scheduling entities to schedule sidelink communication between UEs 126 and 128.

The sidelink communication 127 between UEs 126 and 128 or between UEs 138, 140, and 142 may occur over a proximity service (ProSe) PC5 interface. ProSe communication may support different operational scenarios, such as in-coverage, out-of-coverage, and partial coverage. Out-of-coverage refers to a scenario in which UEs (e.g., UEs 138, 140 and 142) are outside the coverage are of a base station (e.g., base station 146), but each are still configured for ProSe communication. Partial coverage refers to a scenario in which a UE is outside the coverage area of a base station, while one or more other UEs in communication with the UE are in the coverage area of a base station. In-coverage refers to a scenario in which UEs (e.g., UEs 126 and 128) are in communication with a base station (e.g., base station 112) via a Uu (e.g., a cellular interface) connection to receive ProSe service authorization and provisioning information to support ProSe operation.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
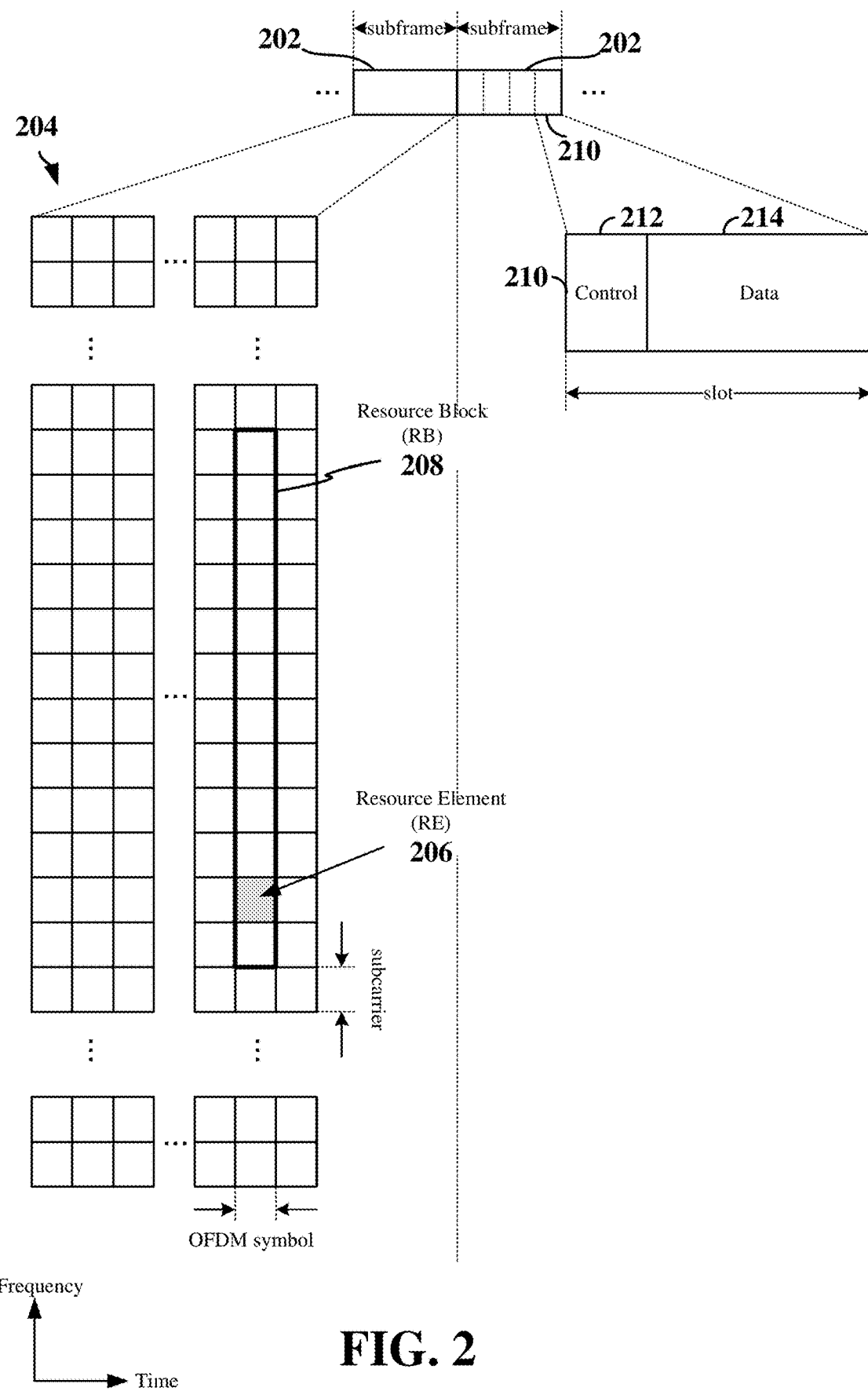
FIG. 2 is a schematic diagram illustrating organization of wireless communication link resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs devices for downlink, uplink, or sidelink transmissions typically involves scheduling one or more resource elements 206 within one or more sub-bands. Thus, a UE device generally utilizes only a subset of the resource grid 204. In some examples, an RB may be the smallest unit of resources that can be allocated to a UE device. Thus, the more RBs scheduled for a UE device, and the higher the modulation scheme chosen for the air interface, the higher the data rate for the UE device. The RBs may be scheduled by a base station (e.g., gNB, eNB, RSU, etc.) or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 millisecond (ms) subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 208.

In some examples, the slot 210 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example of cellular communication over a cellular carrier via a Uu interface, for a DL transmission, the scheduling entity (e.g., a base station) may allocate one or more Res 206 (e.g., within the control region 212 of the slot 210) to carry DL control information including one or more DL control channels, such as an SSB, PDCCH, etc. to one or more scheduled entities (e.g., UEs), which may include one or more sidelink devices (e.g., V2X/D2D devices). The PDCCH carries downlink control information (DCI) including, for example, scheduling information that provides a grant, and/or an assignment of REs for DL and UL transmissions.

In an UL transmission over the Uu interface, the scheduled entity may utilize one or more REs 206 to carry UL control information (UCI) including one or more UL control channels, such as a physical uplink control channel (PUCCH), to the scheduling entity. UCI may include, for example, pilots, reference signal, and information to enable or assist in decoding uplink data transmissions. In some examples, the UCI may include a scheduling request (SR), i.e., request for the scheduling entity to schedule uplink transmissions.

In addition to control information, one or more REs 206 (e.g., within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 may be configured to carry system information blocks (SIBs), carrying information that may enable access to a given cell.

In an example of sidelink communication over a sidelink carrier via a PC5 interface, the control region 212 of the slot may include control information transmitted by sidelink devices over the sidelink channel, while the data region 214 of the slot 210 may include data transmitted by sidelink devices over the sidelink channel. In some examples, the control information may be transmitted within sidelink control information (SCI) over a physical sidelink control channel (PSCCH), while the data may be transmitted within a physical sidelink shared channel (PSSCH). For in-coverage or partial-coverage scenarios, the DCI transmitted by the base station over the Uu interface may include scheduling information indicating one or more resource blocks within the control region 212 and/or data region 214 allocated to sidelink devices for sidelink communication.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
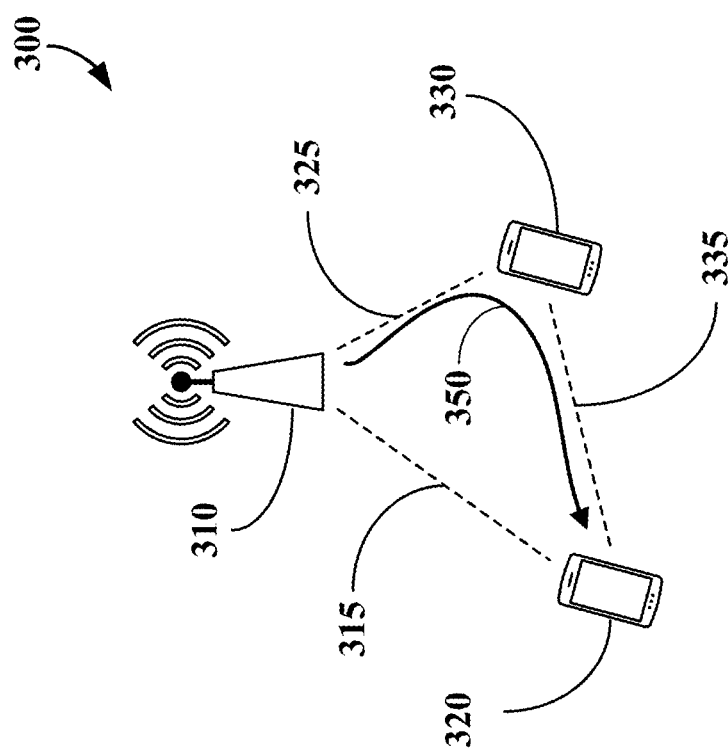
FIG. 3 illustrates an example wireless communication system according to some aspects.

FIG. 3 illustrates an example wireless communication system 300 according to some aspects. The wireless communication system 300 includes a base station 310, a user equipment (UE) 320, and a relay user equipment (UE) 330. The base station 310 may provide radio access to a cell or small cell, within which the UE 320 and relay UE 330 reside. The base station 310 communicates with the UE 320 via a cellular communication link 315 (sometimes referred to as a "Uu" link). Similarly, the base station 310 communicates with the relay UE 330 via a cellular communication link 325 (e.g., another Uu link). The UE 320 and the relay UE 330 may further be configured to communicate with each other via a sidelink 335 (e.g., sometimes referred to as a "PC5" link).

In certain conditions, the UE 320 may be receiving downlink (DL) data from the base station 310 via the cellular communication link 315, while the sidelink 335 to the relay UE 330 does not exist. Thus, in such conditions, the communication link 315 is the only link between the base station 310 and the UE 320 for receiving DL data (or performing other types of communication). In certain conditions, the communication link 315 may be impaired or degraded due to temporary wireless environment changes, such as signal interference or blockage due to, for example, a structure. This condition may be more prevalent in Frequency Range 2 (FR2), the high frequency range (24.250 GHz to 52.6 GHz) specified by the 5G NR protocol, which may be more susceptible to temporary link degradation. Moreover, the rate at which DL data is received by the UE 320 from the base station 310 via the communication link 315 may be limited.

Thus, in such conditions, there may be a need to provide at least one additional communication link beyond the communication link 315 to provide link diversity in the case that communication link 315 is compromised, or to provide link aggregation in the case where higher data rates for DL data is required or desired by the UE 320. As discussed below in more detail, an additional DL data pipeline may be created from the base station 310 to the UE 320 via a relay UE 330. More specifically, the additional DL data pipeline may include the cellular communication link 325 from the base station 310 to the relay UE 330, and the side communication link 335 (e.g., sidelink) between the relay UE 330 and the UE 320. Here, the cellular communication link 325 may be referred to as a first communication link 325 and the sidelink 335 may be referred to as a second communication link.

As discussed in more detail below, the base station 310, acting as a scheduling entity, generates and transmits a joint grant to the relay UE 330, where the joint grant includes a first resource assignment (e.g., a set of RBs) for transmitting DL data from the base station 310 to the relay UE 330 via the first communication link 325, and a second resource assignment for transmitting the DL data from the relay UE 330 to the UE 320 via the second communication link 335. The first and second communications links 325 and 335 forming a pipeline 350 for transmitting DL data from the base station 310 to the UE 320.

Thus, if the communication link 315 is impacted due to poor signal transmission/reception or interference, the UE 320 may receive DL data from the base station 310 via the DL pipeline 350. Or, if higher DL data rates are desired by the UE 320, the UE 320 may simultaneously receive DL data via the communication link 315 and the pipeline 350. A DL pipeline may be described as a radio bearer (e.g., a 5G or eUTRAN radio bearer) for transmitting user plane and/or control plane data from a base station to a UE. A DL pipeline may also be described as one or more associated data channels or logical channels for transmitting user plane and/or control plane data from a base station to a UE. The one or more associated data channels may be between a base station and a relay UE via a cellular link (e.g., Uu link), one or more pairs of relay UEs via one or more sidelinks (e.g., PC5 link), and between a relay UE and the UE (to which the user plane or control plane data is destined) via a sidelink (e.g., PC5 link).

Figure 4:
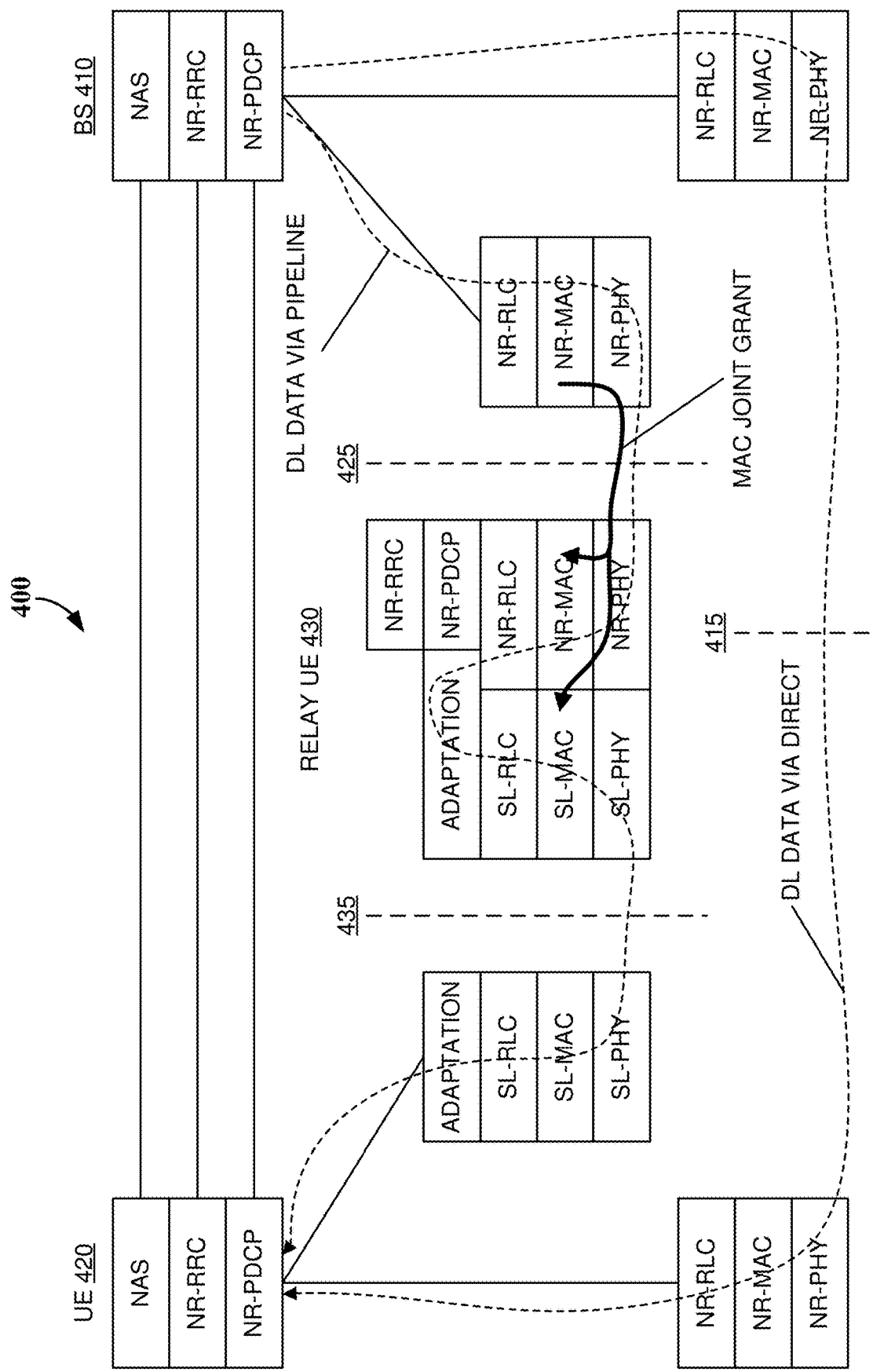
FIG. 4 is a diagram illustrating an example protocol layer stack diagram of a base station, user equipment (UE), and relay user equipment (UE) for establishing a downlink pipeline between the base station and the user equipment (UE) via the relay user equipment (UE) according to some aspects.

FIG. 4 is a diagram illustrating an example protocol stack layer diagram of a wireless communication system 400 according to some aspects. The wireless communication system 400 may correspond to or be a more detailed implementation of the wireless communication system 300 previously discussed. In particular, the wireless communication system 400 includes a base station (BS) 410, a UE 420, and a relay UE 430. The base station 410, UE 420, and relay UE 430 may correspond to the base station 310, UE 320, and relay UE 330 of wireless communication system 300, respectively.

The base station 410 may include layer 3 (network layer) protocol stack processing components, such as Non-Access Stratum (NAS), New Radio-Radio Resource Control (NR-RRC), and New Radio-Packet Data Convergence Protocol (NR-PDCP). The base station 410 may also include layer 2 (data link layer) protocol stack processing components, such as New Radio-Radio Link Control (NR-RLC) and New Radio-Media Access Control (NR-MAC). Further, the base station 410 may include layer 1 (physical layer) protocol stack processing component, such as New Radio-Physical (NR-PHY).

Similarly, the UE 420 may include layer 3 (network layer) protocol stack processing components, such as NAS, NR-RRC, and NR-PDCP. The UE 420 may also include layer 2 (data link layer) protocol stack processing components, such as NR-RLC and NR-MAC. Further, the UE 420 may include layer 1 (physical layer) protocol stack processing component, such as NR-PHY. Additionally, the UE 420 may include layer 2 (data link layer) protocol stack processing components for establishing sidelink (SL) communication with other UEs, such as an Adaptation layer, SL-RLC and SL-MAC, and associated layer 1 (physical) protocol stack processing component SL-PHY.

Similarly, the relay UE 430 may include layer 3 (network layer) protocol stack processing components, such as NR-RRC and NR-PDCP. The relay UE 430 may also include layer 2 (data link layer) protocol stack processing components, such as NR-RLC and NR-MAC. Further, the relay UE 430 may include layer 1 (physical layer) protocol stack processing component, such as NR-PHY. Additionally, the relay UE 430 may include layer 2 (data link layer) protocol stack processing components for establishing sidelink (SL) communication with other UEs, such as an Adaptation layer, SL-RLC and SL-MAC, and associated layer 1 (physical) protocol stack processing component SL-PHY.

As discussed with reference to wireless communication system 300, the UE 420 and the base station 410 exchange layer 3 (NAS, NR-RRC, and NR-PDCP) signaling, layer 2 signaling (NR-RLC, NR-MAC), and layer 1 signaling (NR-PHY) to establish a communication link 415 (represented as a vertical dashed line) for the UE 420 to receive DL data from (or perform other types of communications with) the base station 410. However, as discussed above, with respect to diversity, this communication link 415 may be temporality corrupted or degraded, resulting in a need for an additional link through which the UE 420 may receive DL data from the base station 410. In addition, with respect to aggregation, the UE 420 may desire the data rate of the DL data it receives from the base station 410 to be higher than can be currently attained by the communication link 415.

Accordingly, to establish an additional resource between the base station 410 and the UE 420 for DL data transmission purpose, the base station 410 sends a MAC joint grant to the relay UE 430; in particular, from the base station NR-MAC and NR-PHY processing components to the NR-PHY and NR-MAC and SL-MAC processing components of the relay UE 430 (as represented by the thicker lines with arrows). The joint grant includes a first resource assignment for transmitting DL data via a first communication link 425 (represented as a vertical dashed line) between the base station 410 and the relay UE 430. This portion of the joint grant originates from the NR-MAC of the base station 410 and terminates at the NR-MAC of the relay UE 430 via the respective NR-PHY components of the base station and relay UE. The joint grant also includes a second resource assignment for transmitting DL data via a second communication link 435 (represented as a vertical dashed line) between the relay UE 430 and the UE 420. This portion of the joint grant originates from the NR-MAC of the base station 410 and terminates at the SL-MAC of the relay UE 430 via the respective NR-PHY components of the base station and relay UE.

As illustrated, the granted resources associated with the first and second communication links 425 and 435 form a pipeline for transmitting (DL) data from the base station 410 to the UE 420 via all the protocol stack processing as illustrated by the dashed line traversing the various protocol stack processing components. For example, DL data is transmitted from the NR-PDCP processing component of the base station 410 to the NR-PDCP of the UE 420, via the NR-RLC, NR-MAC, and NR-PHY processing components of the base station 410, the NR-PHY, NR-MAC, NR-RLC, Adaptation, SL-RLC, SL-MAC, and SL-PHY processing components of the relay UE 430, and the SL-PHY, SL-MAC, SL-RLC, and Adaptation processing components of the UE 420.

Figure 5:
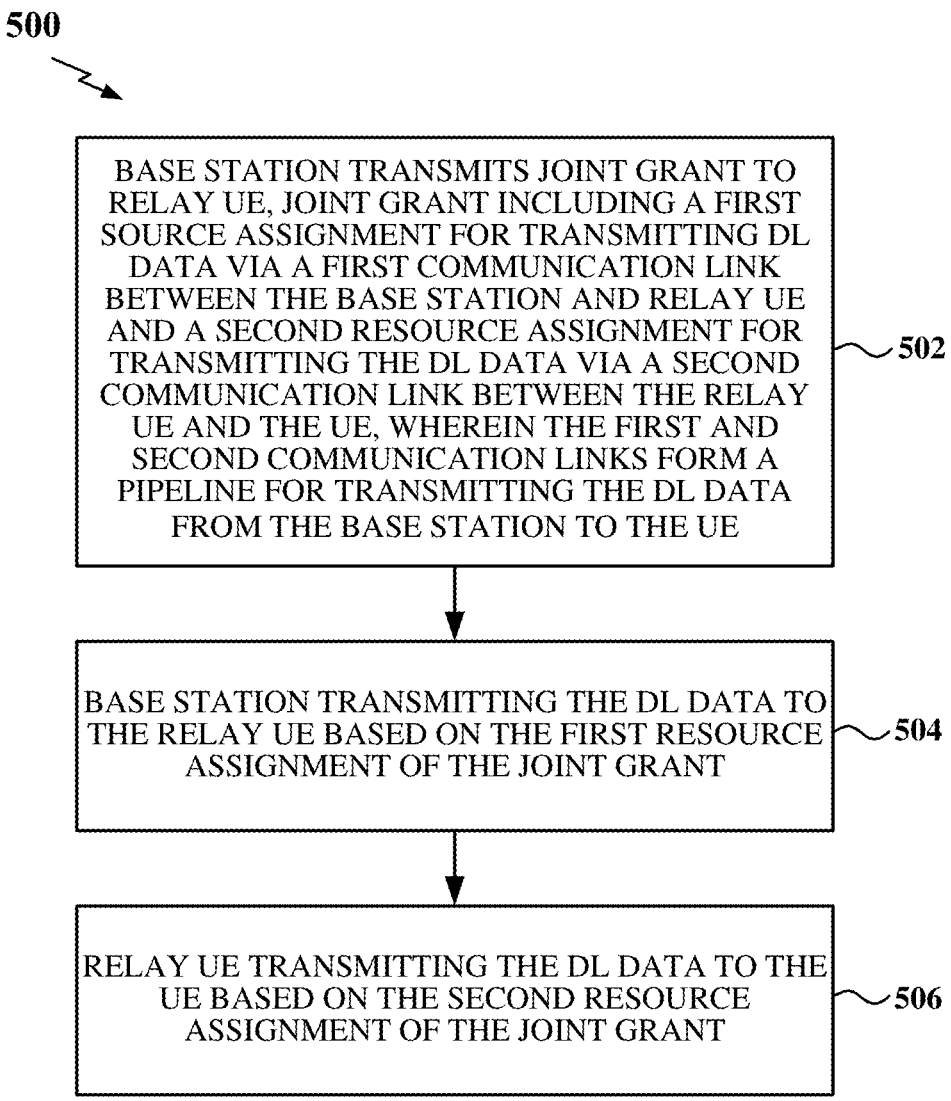
FIG. 5 is a diagram illustrating an exemplary method of forming a downlink pipeline between a base station and a user equipment (UE) via a relay user equipment (UE) according to some aspects.

FIG. 5 is a flow diagram of an exemplary method 500 of forming a downlink data pipeline between a base station and a user equipment (UE) via a relay user equipment (UE) according to some aspects. The method 500 includes the base station transmitting a joint grant to the relay UE, the joint grant including a first resource assignment for transmitting DL data via a first communication link between the base station and the relay UE, and a second resource assignment for transmitting the DL data via a second communication link between the relay UE and the UE, wherein the first and second communication links form a pipeline for transmitting the DL data from the base station to the UE (block 502).

The method 500 further includes the base station transmitting the DL data to the relay UE based on the first resource assignment of the joint grant (block 504). The method 500 also includes the relay UE transmitting the DL data to the UE based on the second resource assignment of the joint grant (block 506).

Figure 6A:
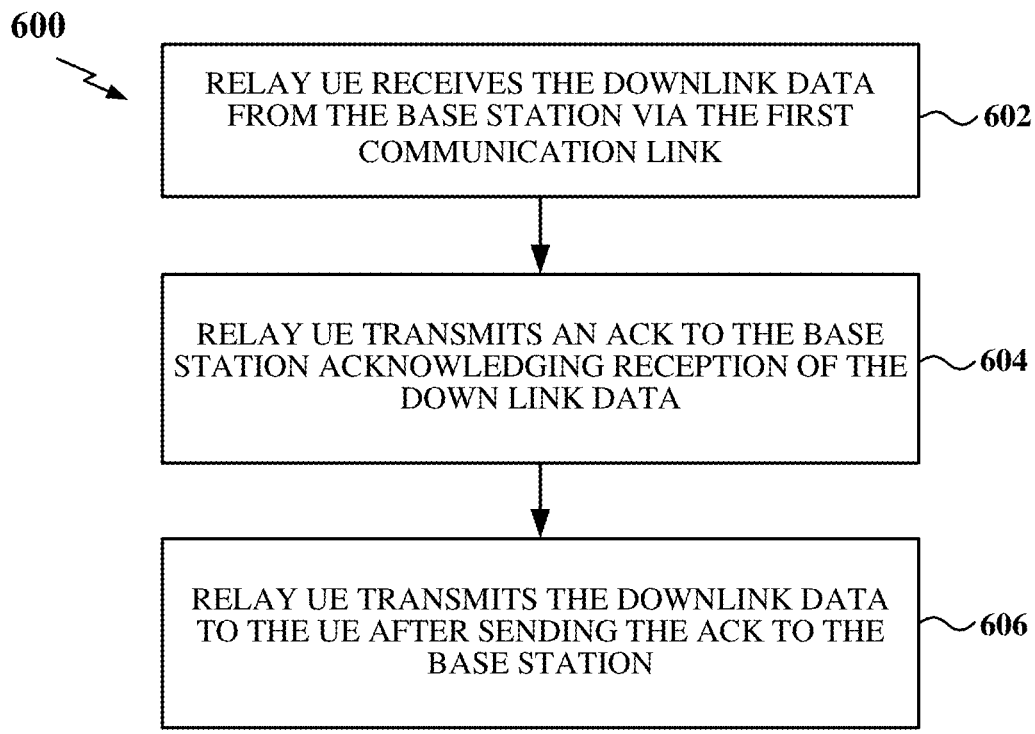
FIGS. 6A and 6B illustrate exemplary methods of a relay user equipment (UE) using a sidelink to a user equipment (UE) to relay downlink data to the user equipment (UE) according to some aspects.

FIG. 6A illustrates a flow diagram of an exemplary method 600 of determining when a relay equipment (UE) is able to use the sidelink to relay downlink (DL) data to the user equipment (UE) according to some aspects. The method 600 includes the relay UE receiving the downlink (DL) data from the base station via the first communication link (block 602). The method 600 also includes the relay UE transmits an acknowledgement (ACK) to the base station acknowledging the reception of the DL data (block 604). The ACK informs the base station that resource for the DL data transmission via the second communication link (the sidelink) has been granted. Additionally, the method 600 includes the relay UE transmitting the DL data to the UE after sending the ACK to the base station (block 606).

Figure 6B:
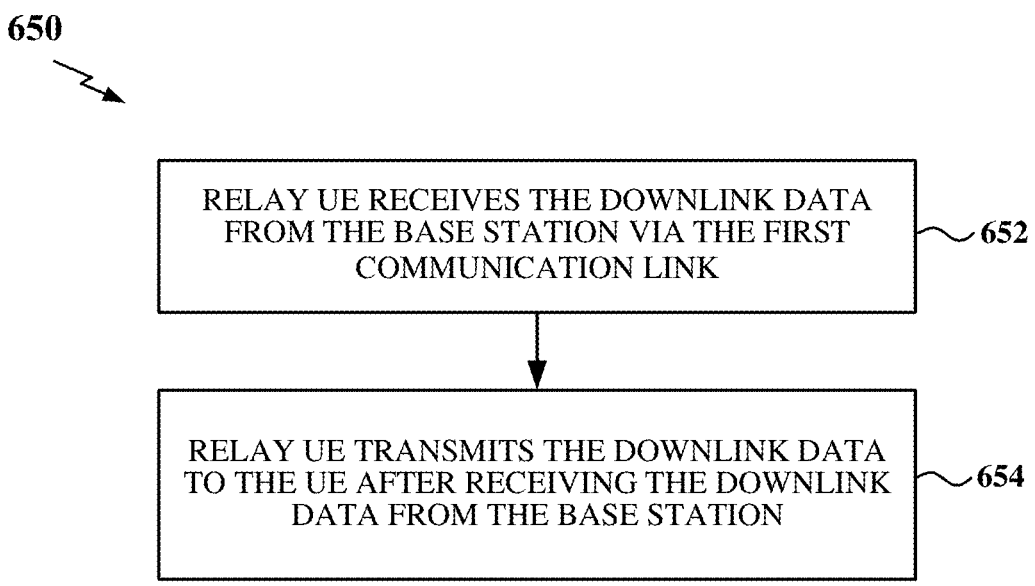

FIG. 6B illustrates a flow diagram of another exemplary method 650 of determining when the relay equipment (UE) is able to use the sidelink to relay the downlink (DL) data to the user equipment (UE) according to some aspects. The method 650 includes the relay UE receiving the downlink (DL) data from the base station via the first communication link (block 652). The method 650 further includes the relay UE transmitting the DL data to the UE when the data is received from the base station or after some short time interval for allowing decoding of the data. (block 654).

Figure 7A:
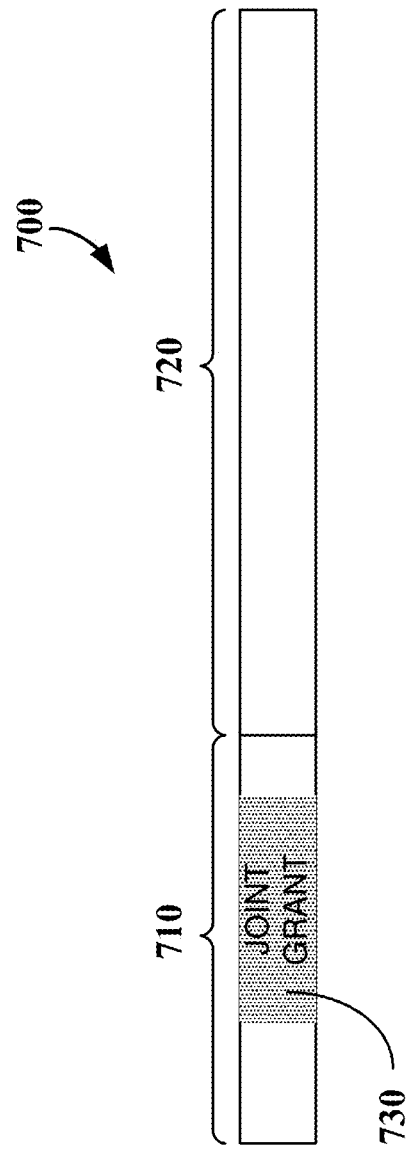
FIGS. 7A and 7B illustrate exemplary frames for transmitting a joint grant for resources to form a downlink pipeline from a base station to a user equipment (UE) via a relay equipment (UE) according to some aspects.

FIG. 7A illustrates an exemplary frame 700 for transmitting a joint grant 730 for resources to form a downlink pipeline from a base station to a user equipment (UE) via a relay equipment (UE) according to some aspects. The frame 700, which may be a MAC frame, includes a control field 710 (e.g., a control element (CE), physical downlink control channel (PDDCH), or downlink control information (DCI)) and a data field 720 (e.g., a control payload field or physical downlink shared channel (PDSCH)). In this example, the joint grant 730 is organized in a single stage. That is, the control field 710 of the frame 700 includes the entire joint grant including the first resource assignment for the DL data transmission via a first communication link between the base station and the relay UE, and a second resource assignment for the DL data transmission via a second communication link between the relay UE and the UE, wherein the first and second communication links form a pipeline for transmitting the DL data from the base station to the UE.

Figure 7B:
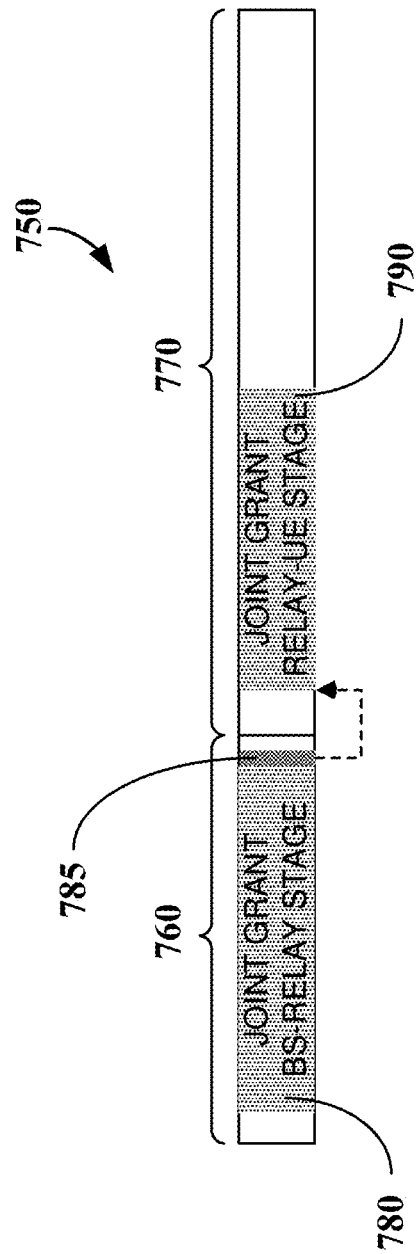

FIG. 7B illustrates another exemplary frame 750 for transmitting a joint grant 780/790 for resources to form a downlink pipeline from a base station to a user equipment (UE) via a relay equipment (UE) according to some aspects. The frame 750, which may be a MAC frame, includes a control field 760 (e.g., a control element (CE), physical downlink control channel (PDDCH), or first downlink control information (DCI)) and a data field 770 (e.g., a control payload field or physical downlink shared channel (PDSCH)). In this example, the joint grant 730 is organized into two stages. That is, the control field 760 of the frame 750 includes a first stage 780 of the joint grant 780/790 including the first resource assignment for DL data transmission via a first communication link between the base station and the relay UE. The payload field 770 of the frame 750 includes a second stage 790 of the joint grant 780/790 including the second resource assignment for the DL data transmission via a second communication link between the relay UE and the UE. The control field 760 of the frame 750 may include a pointer 785 that points to the second stage 790 of the joint grant 780/790. As discussed, the first and second communication links form a pipeline for transmitting the DL data from the base station to the UE.

Figure 8:
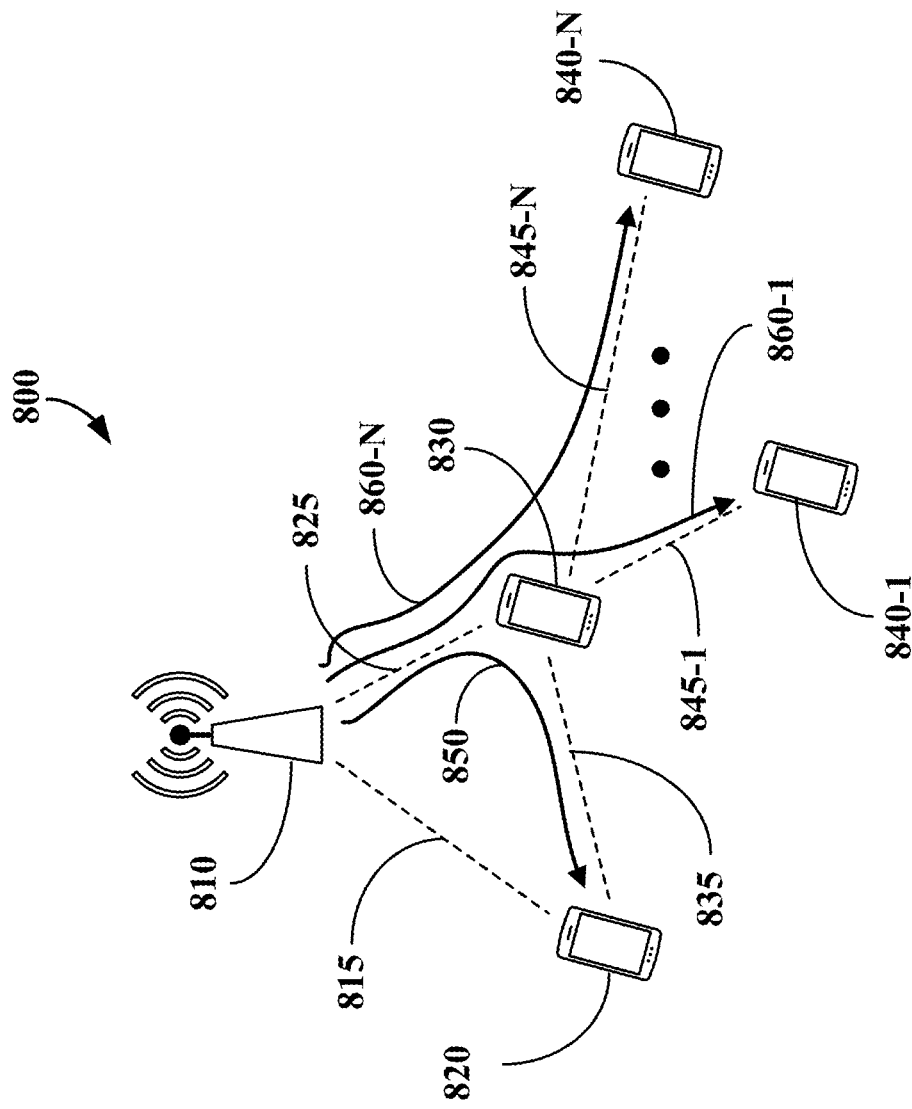
FIG. 8 illustrates another example wireless communication system according to some aspects.

FIG. 8 illustrates another example wireless communication system 800 according to some aspects. The wireless communication system 800 includes a base station 810, a user equipment (UE) 820, a relay user equipment (UE) 830, and a set of one or more other UEs 840-1 to 840-N (where N is an integer of one or more). The base station 810 may provide radio access to a cell or small cell, where the UE 820, relay UE 830, and the set of one or more other UEs 840-1 to 840-N all reside.

The base station 810 communicates with the UE 820 via a cellular communication link 815 (sometimes referred to as a "Uu" link). Similarly, the base station 810 communications with the relay UE 830 via a cellular communication link 825 (e.g., another Uu link). The UE 820 and the relay UE 830 communicate with each other via a sidelink 835 (e.g., sometimes referred to as a "PC5" link). The relay UE 830 communicates with the set of one or more other UEs 840-1 to 840-N via a set of one or more side communication links 845-1 to 845-N, respectively.

For link diversity and aggregation purposes, as previously discussed, the base station 810, acting as a scheduling entity, generates and transmits a joint grant to the relay UE 830, where the joint grant includes a first resource assignment for transmitting downlink (DL) data via the first communication link 825 between the base station 810 and the relay UE 830, and a second resource assignment for transmitting the DL data via the second communication link 835 between the relay UE 830 and the UE 820. As discussed, the first and second communications links 825 and 835 form a pipeline 850 for transmitting DL data from the base station 810 to the UE 820.

However, in this example, the set of one or more other UEs 840-1 to 840-N may desire their own DL data pipelines via the relay UE 830. Accordingly, the joint grant transmitted from the base station 810 to the relay UE 830 also includes additional resource assignments for transmitting DL data via a set of one or more communication links 845-1 to 845-N from the relay UE 830 to the set of one or more other UEs 840-1 to 840-N, respectively. Thus, in response to the joint grant, the UE 830 receives DL data via the communication link 825 from the base station 810 and transmits (relays) the DL data via the set of one or more communication links 845-1 to 845-N to the set of one or more other UEs 840-1 to 840-N, respectively. Thus, there exists a set of one or more DL data pipelines 860-1 to 860-N from the base station 810 to the set of one or more other UEs 840-1 to 840-N via the communication link 825 in series with the set of one or more communication links 845-1 to 845-N, respectively.

Figure 9:
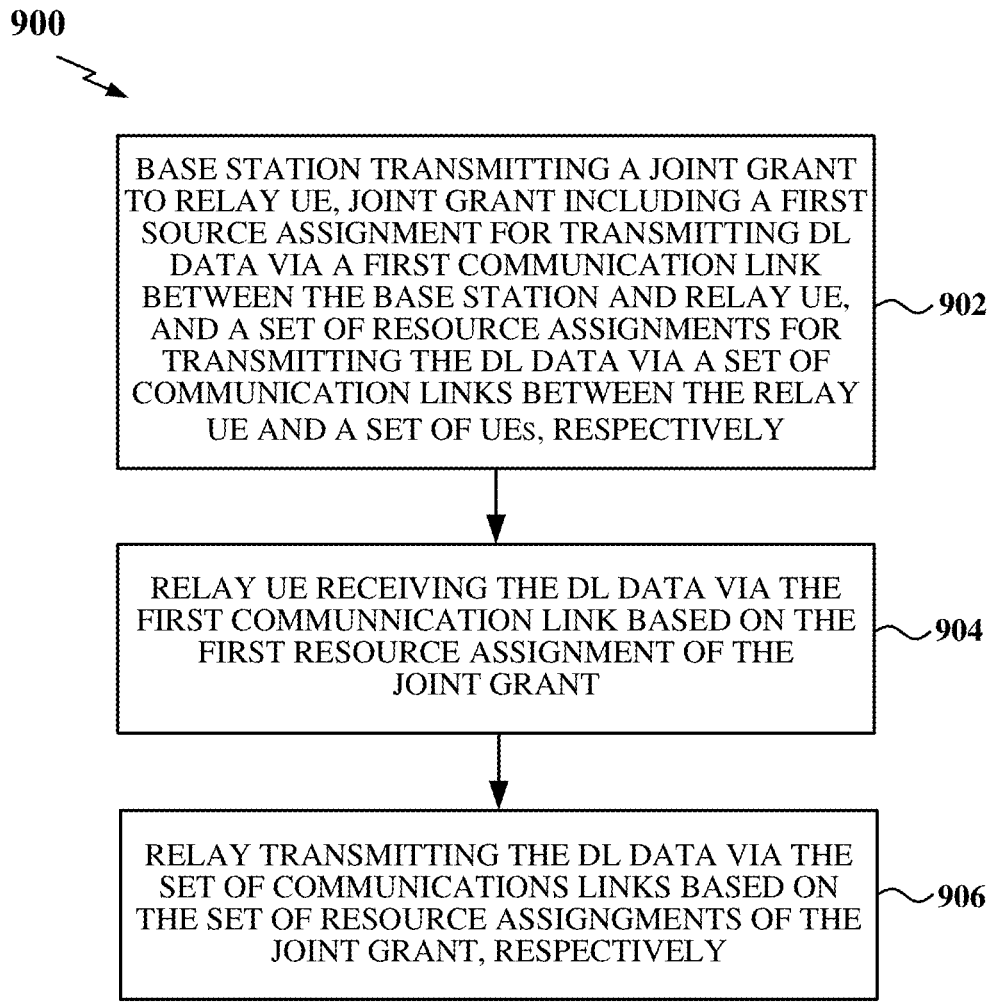
FIG. 9 is a flow diagram of an exemplary method of forming downlink pipelines between a base station and a set of user equipment (UEs) via a relay user equipment (UE) according to some aspects.

FIG. 9 is a flow diagram of an exemplary method 900 of forming a downlink data pipeline between a base station and a set of user equipment (UEs) via a relay user equipment (UE) according to some aspects. The method 900 includes the base station transmitting a joint grant to the relay UE including a first resource assignment for transmitting DL data via a first communication link between the base station and the relay UE, and a set of resource assignments for transmitting the DL data via a set of communication links between the relay UE and the set of UEs, respectively (block 902).

The method 900 further includes the relay UE receiving the DL data via the first communication link based on the first resource assignment of the joint grant (block 904). The method 900 also includes the relay UE transmitting the DL data via the set of communication links between the relay UE and the set of the UEs based on the set of resource assignments of the joint grant, respectively (block 906). The first communication link and the set of communication links forming DL data pipelines to the set of UEs, respectively.

Figure 10:
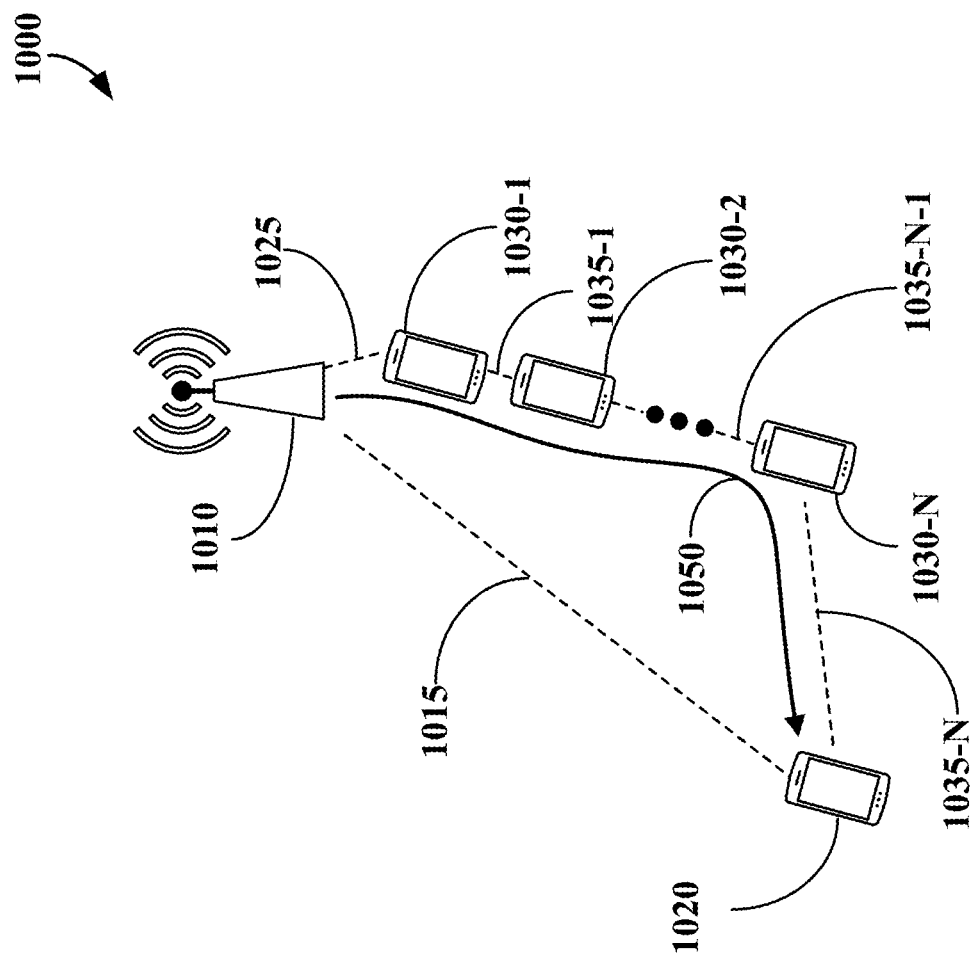
FIG. 10 illustrates yet another example wireless communication system according to some aspects.

FIG. 10 illustrates another example wireless communication system 1000 according to some aspects. The wireless communication system 1000 includes a base station 1010, a user equipment (UE) 1020, and a set of relay user equipment (UEs) 1030-1 to 1030-N (where N is an integer of two or more). The base station 1010 may provide radio access to a cell or small cell, where the UE 1020 and the set of relay UEs 1030-1 to 1030-N reside.

The base station 1010 communicates with the UE 1020 via a cellular communication link 1015 (sometimes referred to as a "Uu" link). Similarly, the base station 1010 communications with the first relay UE 1030-1 of the set via a cellular communication link 1025 (e.g., another Uu link). The first relay UE 1030-1 communicates with the UE 1020 via one or more remaining relay UEs 1030-2 to 1030-N of the set via a set of cascaded (chained) side communication links 1035-1 to 1035-N (e.g., sometimes referred to as a "PC5" link) in a multiple hops manner.

Again, for link diversity and aggregation purposes, the base station 1010, acting as a scheduling entity, generates and transmits a multicast (or broadcast) joint grant to the set of relays UE 1030-1 to 1030-N, where the joint grant includes a set of resource assignments for transmitting downlink (DL) data via the set of communication links 1025 and 1035-1 to 1035-N between the base station 1010 and the UE 1020. The set of cascaded communications links 1025 and 1035-1 to 1035-N form a pipeline 1050 for transmitting DL data from the base station 1010 to the UE 1020.

Figure 11:
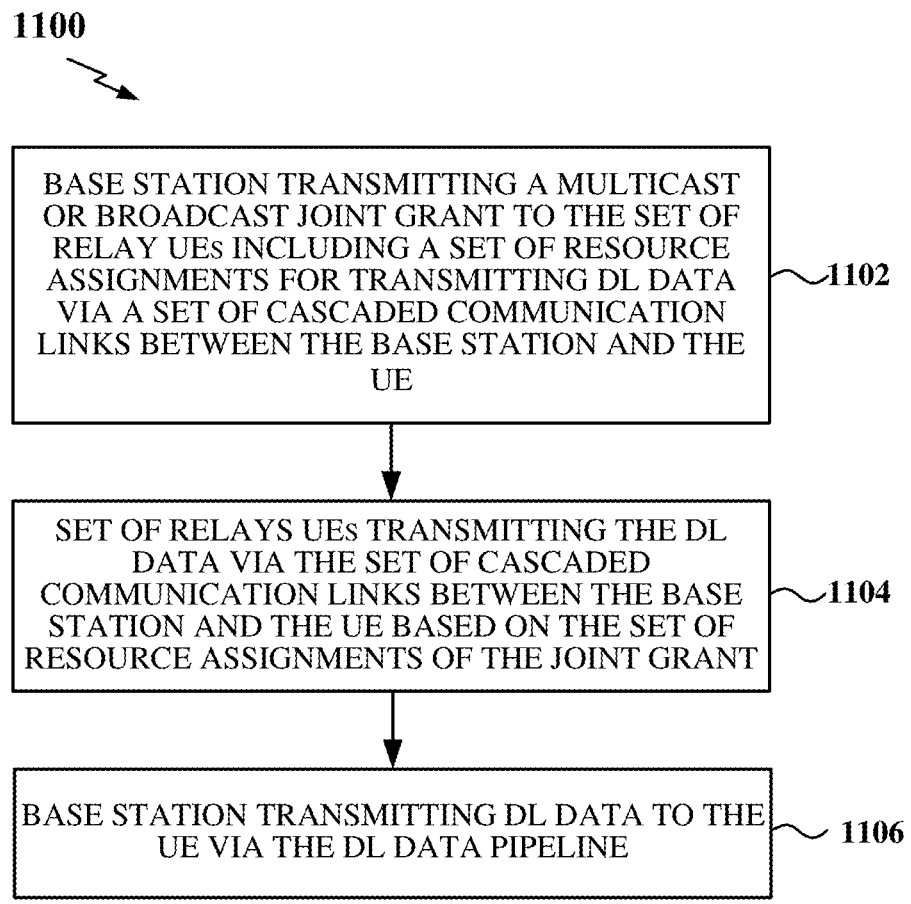
FIG. 11 is a flow diagram of an exemplary method of forming a downlink pipeline between a base station and a user equipment (UE) via a set of cascaded relay user equipment (UEs) according to some aspects.

FIG. 11 is a flow diagram of an exemplary method 1100 of forming a downlink data pipeline between a base station and a user equipment (UE) via a set of relay user equipment (UEs) according to some aspects. The method 1100 includes the base station transmitting a multicast or broadcast joint grant to the set of relay UEs including a set of resource assignments for transmitting downlink (DL) data via a set of cascaded communication links between the base station and the UE (block 1102).

The method 1100 further includes the set of relays UEs transmitting the DL data via the set of cascaded communication links between the base station and the UE based on the set of resource assignments of the joint grant (block 1104). The set of cascaded communication links forming a DL data pipeline to the UE. Additionally, the method 1100 includes the base station transmitting DL data to the UE via the DL data pipeline (block 1106).

With regard to the type of data that may be transmitted via the created pipelines 350, 850, 860-1 to 860-N, and 1050, the corresponding base station may generate the joint grant to provide restrictions regarding the type of data that may be transmitted via these pipelines. Generally, there are two options: (1) coupled and (2) decoupled. In the coupled option, the joint grant restricts the pipeline to communicating DL data from the base station to the UE. Thus, considering the example of FIG. 3, the DL data transmitted via the first communication link 325 (from the base station 310 to the relay UE 330) is the same DL data transmitted via the second communication link 335 (from the relay UE 330 and to the UE 320). It is referred to as "coupled" because the communication links 325 and 335 are coupled or associated together for transmitting DL data from the base station 310 to the UE 320.

Referring again to FIG. 3, another "coupled" scenario is when the joint grant specifies a first set of one or more logical channels for the first communication link 325, and specifies a second set of one or more logical channels for the second communication link 335. In this case, the joint grant restricts the transfer of the DL data from the base station 310 to the UE 320 via the first set of one or more logical channels of the first communication link 325 and the second set of one or more logic channels of the second communication link 335. Thus, in this scenario, if the relay UE 330 and the UE 320 establishes one or more other logical channels not in the second set, other types of data may be transmitted between the relay UE 330 and the UE 320 via the one or more other logical channels.

The other option is "decoupled". This option is when the joint grant allows for the transmission of other types of data (other than the DL data between the base station 310 and the UE 320 for which the joint grant) via the established pipeline. That is, the joint grant allows other types of data to be transmitted between the relay UE 330 and the UE 320 via the second communication link 335 or a set of one or more logical channels on the second communication link 335.

Figure 12:
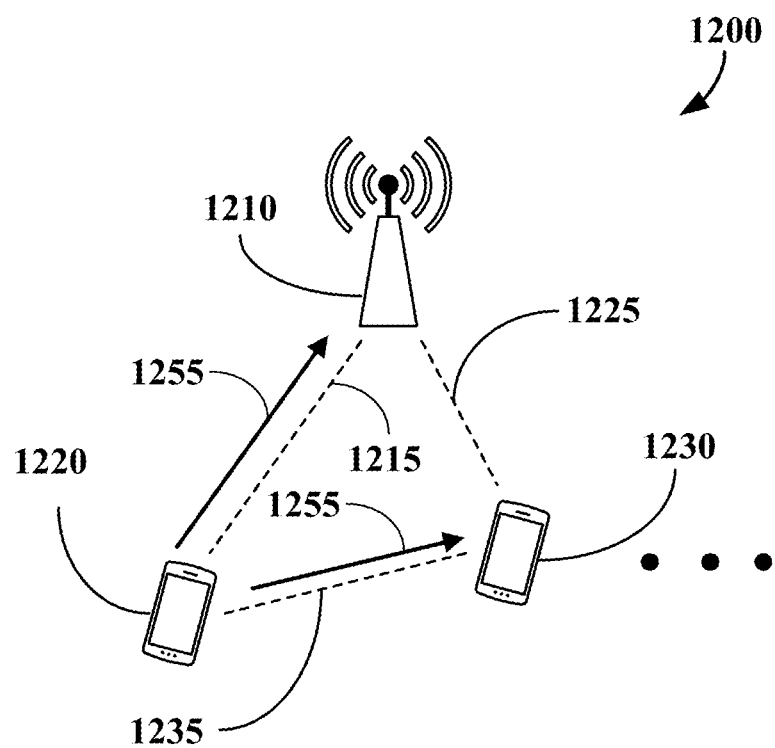
FIG. 12 illustrates another example wireless communication system according to some aspects.

FIG. 12 illustrates an example wireless communication system 1200 according to some aspects. The wireless communication system 1200 includes a base station 1210, a user equipment (UE) 1220, and a relay user equipment (UE) 1230. The base station 1210 may provide radio access to a cell or small cell, within which the UE 1220 and relay UE 1230 reside. The base station 1210 communicates with the UE 1220 via a cellular communication link 1215 (sometimes referred to as a "Uu" link). Similarly, the base station 1210 communications with the relay UE 1230 via a cellular communication link 1225 (e.g., another Uu link). The UE 1220 and the relay UE 1230 may further be configured to communicate with each other via a sidelink 1235 (e.g., sometimes referred to as a "PC5" link).

In certain conditions, the UE 1220 may transmit an uplink (UL) data signal to the base station 1210 via the cellular communication link 1215, while the sidelink 1235 to the relay UE 1230 does not exist. Thus, in such conditions, the communication link 1215 is the only link between the base station 1210 and the UE 1220 for transmitting UL data (or performing other types of communication). In certain conditions, the communication link 1215 may be impaired or degraded due to temporary wireless environment changes, such as signal interference or blockage due to, for example, a structure. This condition may be more prevalent in Frequency Range 2 (FR2), the high frequency range (24.250 GHz to 52.6 GHz) specified by the 5G NR protocol, which may be more susceptible to temporary link degradation. Moreover, the rate at which UL data is transmitted from the UE 1220 to the base station 1210 via the communication link 1215 may be limited.

Thus, in such conditions, there may be a need to provide at least one additional communication link beyond the communication link 1215 to provide link diversity in the case that communication link 1215 is compromised, or to provide link aggregation in the case where higher data rates for UL data is required or desired by the UE 1220. As discussed below in more detail, an additional UL data pipeline may be created from the UE 1220 to the base station 1210 via a relay UE 1230. More specifically, the additional UL data pipeline may include the sidelink communication link 1235 between the UE 1220 and the relay UE 1230, and the cellular communication link 1225 between the relay UE 1230 and the base station 1210.

As discussed in more detail below, the base station 1210, acting as a scheduling entity, generates and transmits a joint grant to the UE 1220, where the joint grant includes a first resource assignment (e.g., a set of RBs for transmitting UL data from the UE 1220 to the base station 1210 via the communication link 1215, and a second resource assignment for transmitting UL data from the UE 1220 to the relay UE 1230 via the second communication link 1235. The relay UE 1230 may, in turn, transmit (relay) the UL data received from the UE 1220 via the communication link 1235 to the base station 1210 via the communication link 1225.

Thus, if the communication link 1215 is impacted due to poor signal transmission/reception or interference, the UE 1220 may transmit UL data to the base station 1210 via the relay UE 1230. Or, if higher UL data rates are desired by the UE 1220, the UE 1220 may simultaneously transmit UL data via the communication link 1215 and the cascaded communications links 1235 and 1225.

Figure 13:
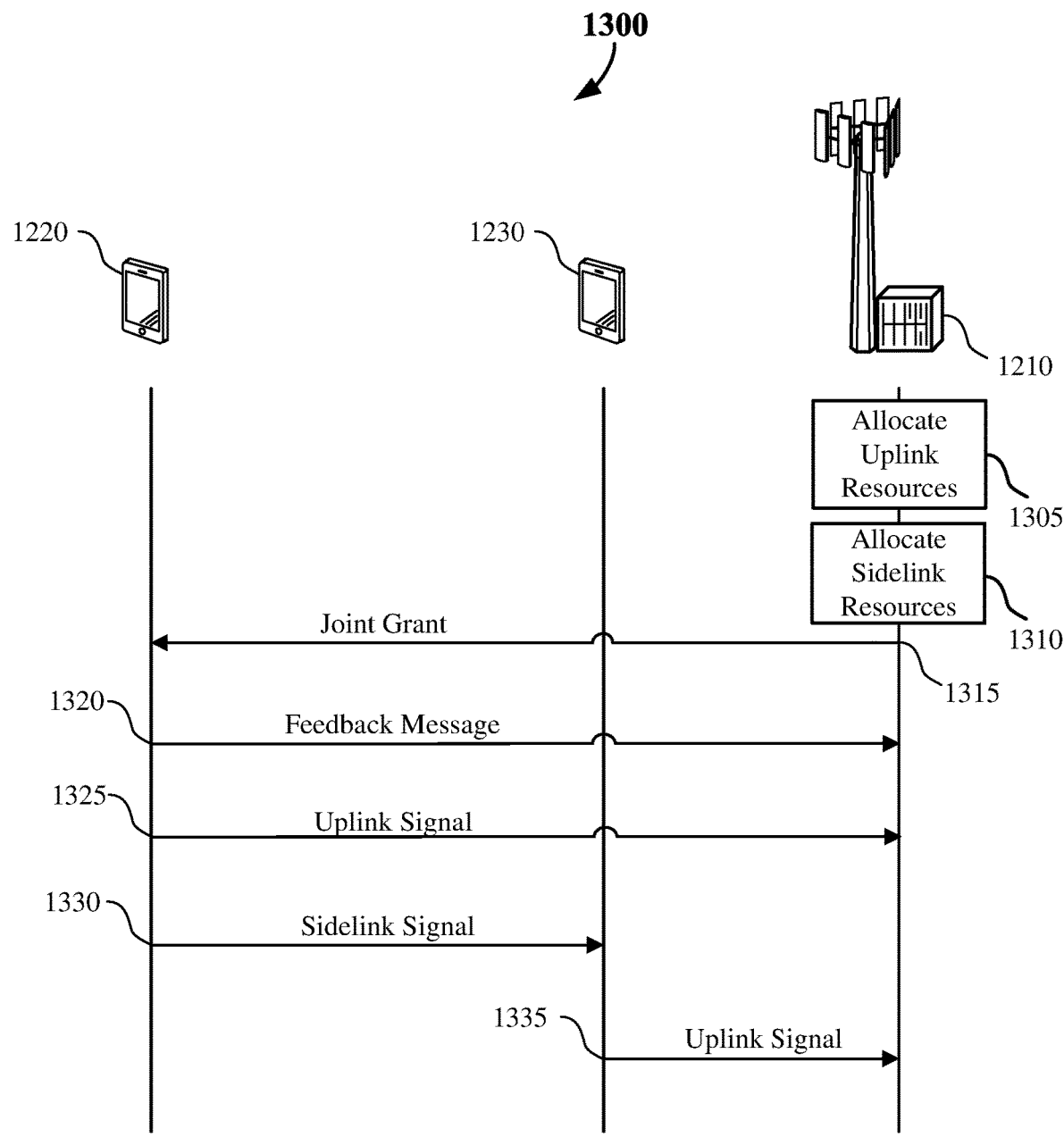
FIG. 13 illustrates an example of a process flow that supports joint grant for uplink and sidelink communications according to some aspects.

FIG. 13 illustrates an example of a process flow 1300 that supports joint grant for uplink and sidelink communications in accordance with aspects of the present disclosure. In some examples, the process flow 1300 may implement aspects of wireless communication systems 100 or 1200. In some cases, the process flow 1300 may include the UE 1220, the relay UE 1230, and the base station 1210, which may be examples of corresponding devices as described herein. In some examples, the operations illustrated in the process flow 1300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 1305, the base station 1210 may allocate resources for transmission of an uplink signal (uplink (UL) data) from the UE 1220 to the base station 1210. For example, the base station 1210 may allocate a first set of resources for transmission of UL data from the UE 1220 to the base station 1210.

At 1310, the base station 1210 may allocate resources for a sidelink signal from the UE 1220 to the relay UE 1230 in communication with the UE 1220. For example, the base station 1210 may allocate a second set of resources for transmission of UL data via a sidelink signal from the UE 1220 to the relay UE 1230 in communication with the UE 1230, the second set of resources being different from the first set of resources.

At 1315, the base station 1210 may transmit a joint grant 1315 to the UE 1220. For example, the base station 1210 may transmit the joint grant 1315 to the UE 1220 via a downlink signal. In some aspects, the joint grant 1315 may be transmitted from the base station 1210 to the UE 1220 via an access link (e.g., the communication link 1215) associated with a radio interface between the UE 1220 and the base station 1210 (e.g., a Uu link). Additionally, or alternatively, the joint grant 1315 may be transmitted from the base station 1210 to the UE 1220 via a PDCCH. In some aspects, the UE 1220 may receive the joint grant 1315 via a MAC payload or a MAC-CE. In some aspects, the joint grant 1315 may include an uplink grant and a sidelink grant. The uplink grant may indicate a first set of resources allocated for transmission of uplink data via an uplink signal from the UE 1220 to the base station 1210 (e.g., Uu link), and the sidelink grant may indicate a second set of resources allocated for transmission of uplink data via a sidelink signal from the UE 1220 to the relay UE 1230 in communication with the UE 1220 (e.g., PC5 link).

At 1320, the UE 1220 may transmit a feedback message (e.g., ACK feedback message) to the base station 1210. The ACK feedback message may indicate reception of the joint grant 1315. For example, upon receiving the joint grant at 1315, the UE 1220 may transmit an ACK feedback message to the base station 1210 at 1320 via the communications link 1215 associated with a radio interface between the UE 1220 and the base station 1210 (e.g., Uu link). The UE 1220 may transmit the ACK feedback message via a PUCCH.

At 1325, the UE 1220 may transmit UL data via an uplink signal to the base station 1210 via the first set of resources allocated for the uplink signal. For example, after receiving the joint grant at 1315, the UE 1220 may transmit, based on receiving the joint grant 1315, the uplink signal to the base station 1210 via the first set of resources allocated for the uplink signal. In some cases, transmitting the uplink signal to the base station 1210 via the first set of resources allocated for the uplink signal may indicate ACK of reception of the joint grant 1315 by the UE 1220. In this regard, in some cases, the transmission of the uplink signal via the first set of resources at 1325 may serve as the feedback message illustrated at 1320. In some aspects, the UE 1220 may transmit the uplink signal to the base station 1210 via a physical uplink shared channel (PUSCH).

At 1330, the UE 1220 may transmit UL data via a sidelink signal to the relay UE 1330 via the second set of resources allocated for the sidelink signal. For example, after receiving the joint grant 1315, the UE 1220 may transmit, based on receiving the joint grant 1315, the sidelink signal to the relay UE 1230 via the second set of resources allocated for the sidelink signal.

At 1335, the relay UE 1230 may be configured to transmit an uplink signal to the base station 1210. In some cases, the relay UE 1230 may be configured to transmit the uplink signal to the base station 1230 based on receiving the sidelink signal from the UE 1335. In this regard, the relay UE 1230 may be configured to relay UL data received via the sidelink signal from the UE 1220. In other words, the relay 1230 may be configured to relay UL data on behalf of the UE 1220. It is noted herein that the relay UE 1230 may be configured to relay the UL data received from the UE 1220 to the base station 1210 or to another relay UE.

In some cases, the first set of resources allocated for the uplink signal and the second set of resources allocated for the sidelink signal are configured for data associated with a same radio bearer. In some instance, the uplink grant is associated with a first set of one or more logical channels, and the sidelink grant is associated with a second set of one or more logical channels corresponding to the first set of one or more logical channels. In some aspects, the first set of resources allocated for the uplink signal are associated with a first bearer, and the second set of resources allocated for the sidelink signal are associated with a second bearer different from the first bearer. In some examples, the second set of resources allocated for the sidelink signal is based on the first set of resources allocated for the uplink signal.

Figure 14:
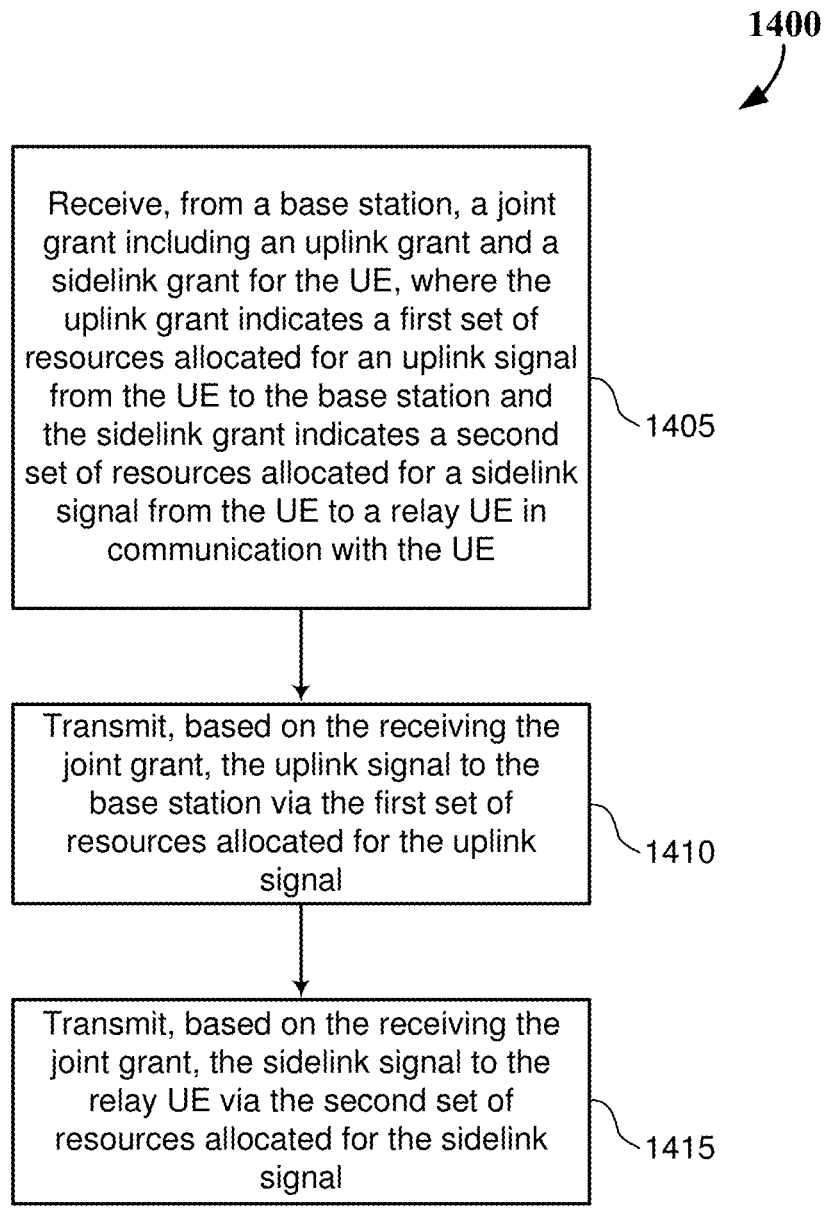
FIGS. 14 through 16 show flowcharts illustrating methods that support joint grant for uplink and sidelink communications according to some aspects.

FIG. 14 shows a flowchart illustrating a method 1400 that supports joint grant for uplink and sidelink communications in accordance with aspects of the present disclosure. The operations of method 1400 may be implemented by the UE 1220 or its components as described herein. For example, the operations of method 1400 may be performed by a processor as described herein. In some examples, a UE may execute a set of instructions to control the functional elements of the UE to perform the functions described herein. Additionally, or alternatively, a UE may perform aspects of the functions described herein using special-purpose hardware.

At 1405, the UE may receive, from a base station, a joint grant including an uplink grant and a sidelink grant for the UE, where the uplink grant indicates a first set of resources allocated for transmitting UL data via an uplink signal from the UE to the base station and the sidelink grant indicates a second set of resources allocated for transmitting UL data via a sidelink signal from the UE to a relay UE in communication with the UE. The operations of 1405 may be performed according to the methods described herein.

The UE may receive first DCI that includes the uplink grant and indicates a second DCI for the sidelink grant. The UE may receive, based on receiving the first DCI, the second DCI that includes the sidelink grant.

At 1410, the UE may transmit, based on the receiving the joint grant, the uplink signal (including UL data) to the base station via the first set of resources allocated for the uplink signal. The operations of 1410 may be performed according to the methods described herein.

At 1415, the UE may transmit, based on the receiving the joint grant, the sidelink signal (including UL data) to the relay UE via the second set of resources allocated for the sidelink signal. The operations of 1415 may be performed according to the methods described herein.

Figure 15:
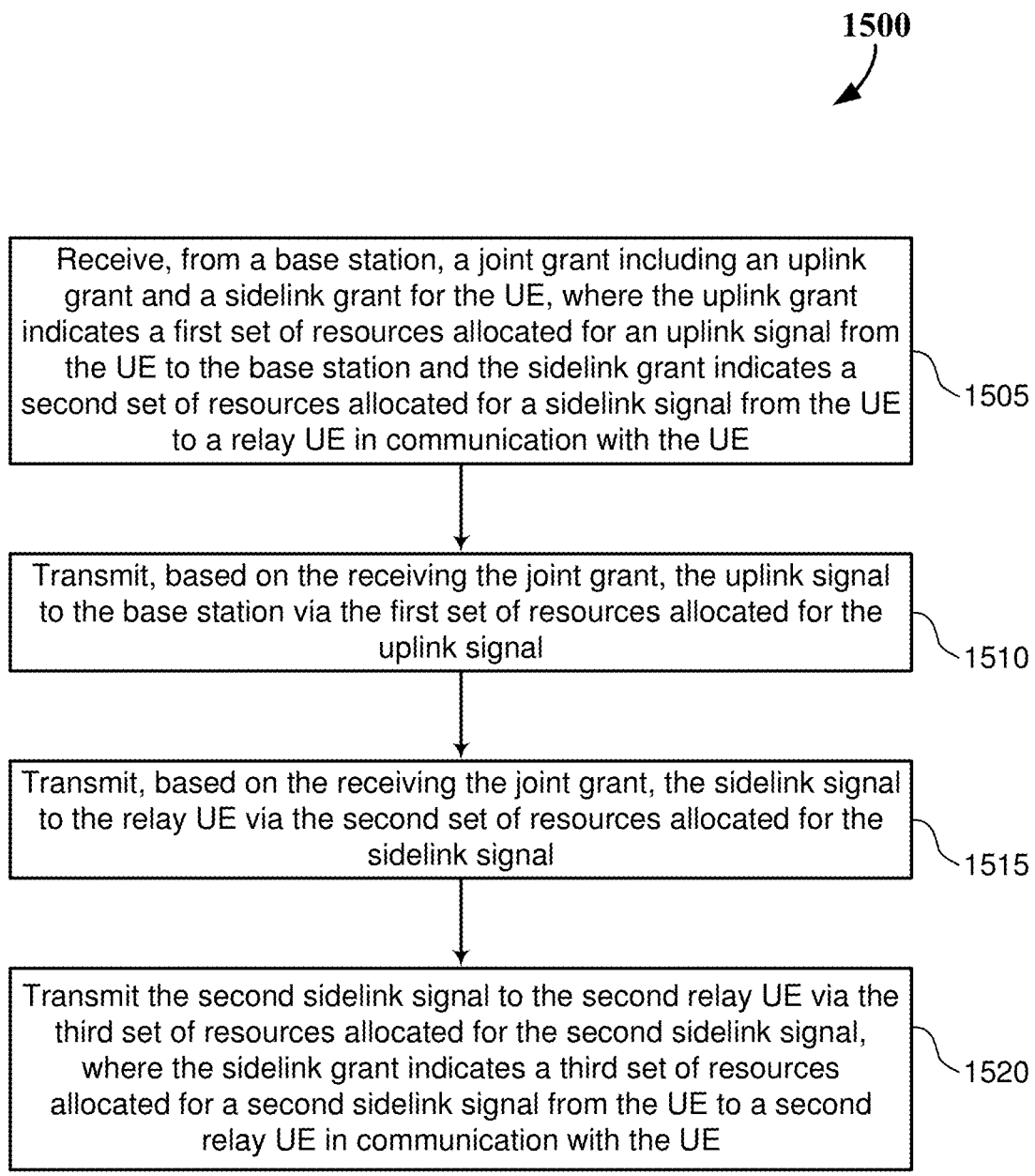

FIG. 15 shows a flowchart illustrating a method 1500 that supports joint grant for uplink and sidelink communications in accordance with aspects of the present disclosure. The operations of method 1500 may be implemented by the UE 1220 or its components as described herein. For example, the operations of method 1500 may be performed by a processor as described herein. In some examples, a UE may execute a set of instructions to control the functional elements of the UE to perform the functions described herein. Additionally, or alternatively, a UE may perform aspects of the functions described herein using special-purpose hardware.

At 1505, the UE may receive, from a base station, a joint grant including an uplink grant and a sidelink grant for the UE, where the uplink grant indicates a first set of resources allocated for transmitting an uplink signal (including UL data) from the UE to the base station and the sidelink grant indicates a second set of resources allocated for transmitting a sidelink signal (including UL data) from the UE to a relay UE in communication with the UE. The operations of 1505 may be performed according to the methods described herein.

At 1510, the UE may transmit, based on the receiving the joint grant, the uplink signal to the base station via the first set of resources allocated for the uplink signal. The operations of 1510 may be performed according to the methods described herein.

At 1515, the UE may transmit, based on the receiving the joint grant, the sidelink signal to the relay UE via the second set of resources allocated for the sidelink signal. The operations of 1515 may be performed according to the methods described herein.

At 1520, the UE may transmit the second sidelink signal to the second relay UE via the third set of resources allocated for the second sidelink signal, where the sidelink grant indicates a third set of resources allocated for a second sidelink signal from the UE to a second relay UE in communication with the UE. The operations of 1520 may be performed according to the methods described herein.

Figure 16:
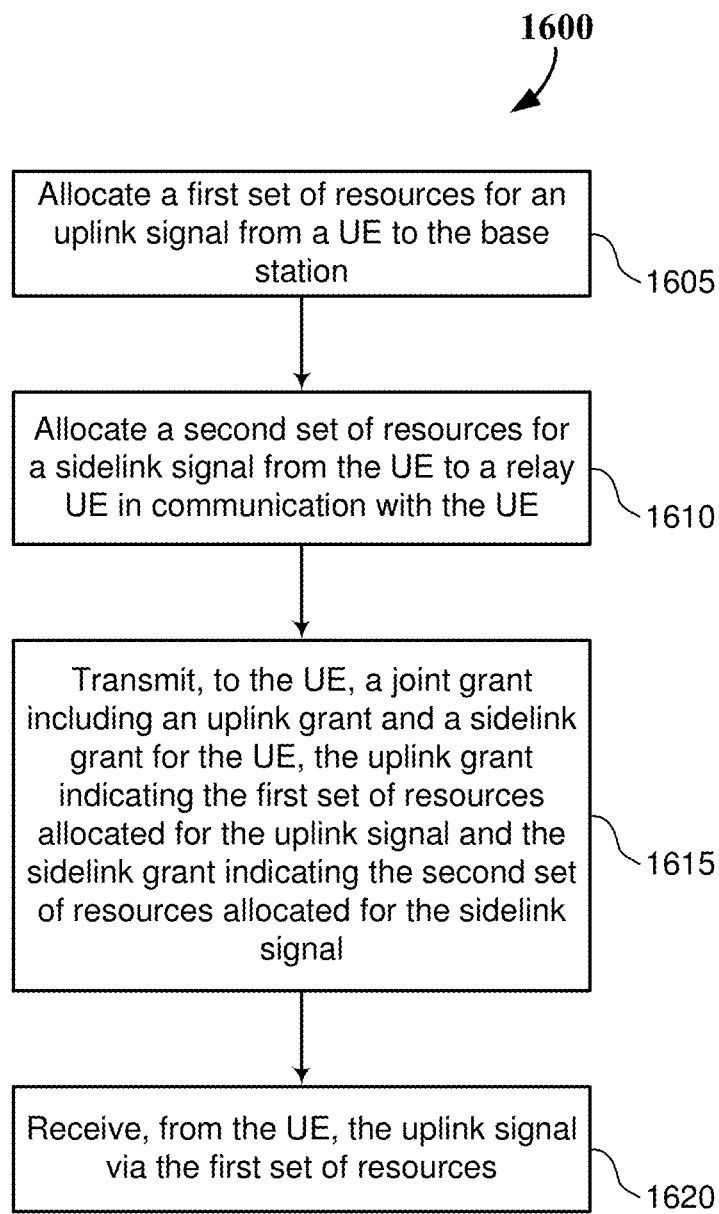

FIG. 16 shows a flowchart illustrating a method 1600 that supports joint grant for uplink and sidelink communications in accordance with aspects of the present disclosure. The operations of method 1600 may be implemented by the base station 1210 or its components as described herein. For example, the operations of method 1600 may be performed by a processor as described herein. In some examples, a base station may execute a set of instructions to control the functional elements of the base station to perform the functions described herein. Additionally, or alternatively, a base station may perform aspects of the functions described herein using special-purpose hardware.

At 1605, the base station may allocate a first set of resources for transmission of an uplink signal (including UL data) from a UE to the base station. The operations of 1605 may be performed according to the methods described herein.

At 1610, the base station may allocate a second set of resources for transmission of a sidelink signal (including UL data) from the UE to a relay UE in communication with the UE. The operations of 1610 may be performed according to the methods described herein.

At 1615, the base station may transmit, to the UE, a joint grant including an uplink grant and a sidelink grant for the UE, the uplink grant indicating the first set of resources allocated for transmitting the uplink signal and the sidelink grant indicating the second set of resources allocated for transmitting the sidelink signal. The operations of 1615 may be performed according to the methods described herein.

The base station may transmit first DCI that includes the uplink grant and indicates a second DCI for the sidelink grant. The base station may transmit, based on transmitting the first DCI, the second DCI that includes the sidelink grant.

At 1620, the base station may receive, from the UE, the uplink signal via the first set of resources. The operations of 1620 may be performed according to the methods described herein.

Figure 17:
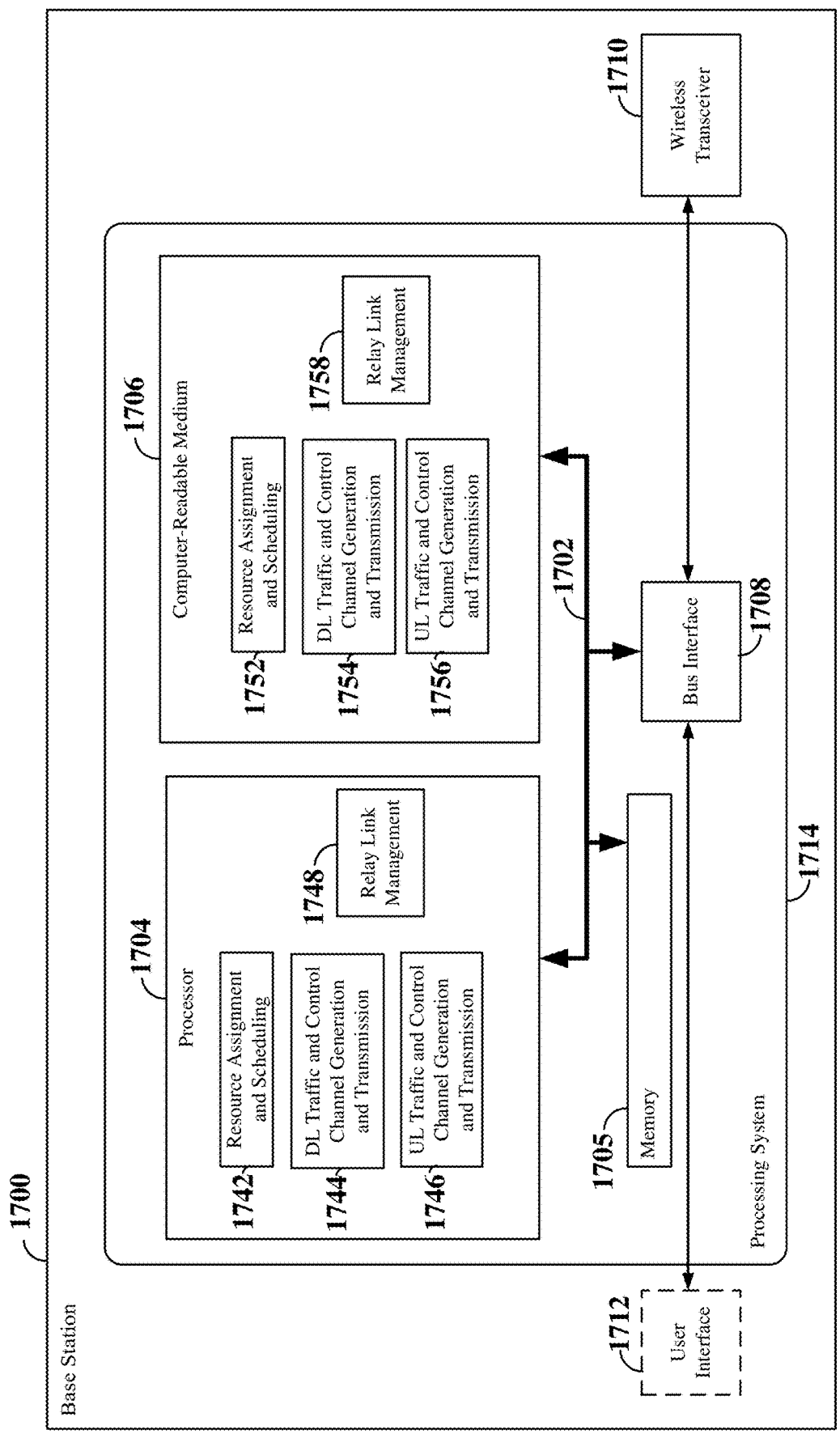
FIG. 17 is a diagram illustrating an example of a hardware implementation for a base station processing system for establishing a data pipeline between a user equipment (UE) and one or more relay user equipment (UEs) and/or between the UE and the base station according to some aspects.

FIG. 17 is a block diagram illustrating an example of a hardware implementation for a base station 1700 employing a processing system 1714. For example, the base station 1700 may correspond to any of the base stations previously discussed herein.

The base station 1700 may be implemented with a processing system 1714 that includes one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station device 1700 may be configured to perform any one or more of the functions described herein. That is, the processor 1704, as utilized in the base station 1700, may be used to implement any one or more of the processes and procedures described below.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 links together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further.

A bus interface 1708 provides an interface between the bus 1702 and a wireless transceiver 1710. The wireless transceiver 1710 allows for the base station 1700 to communicate with various other apparatus over a transmission medium (e.g., air interface). Depending upon the nature of the apparatus, a user interface 1712 (e.g., keypad, display, touch screen, speaker, microphone, control knobs, etc.) may also be provided. Of course, such a user interface 1712 is optional, and may be omitted in some examples.

The processor 1704 is responsible for managing the bus 1702 and general processing, including the execution of software stored on the computer-readable medium 1706. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1704, causes the processing system 1714 to perform the various functions described below for any particular apparatus. The computer-readable medium 1706 and the memory 1705 may also be used for storing data that is manipulated by the processor 1704 when executing software.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. In some examples, the computer-readable medium 1706 may be part of the memory 1705. Those skilled in the art will recognize how best to implement the described functionality presented throughout this disclosure depending on the particular application and the overall design constraints imposed on the overall system.

In some aspects of the disclosure, the processor 1704 may include circuitry configured for various functions. For example, the processor 1704 may include resource assignment and scheduling circuitry 1742 and relay link management 1748 configured to generate a joint grant to establish a DL data pipeline between the base station 1700 and a UE via one or more relay UEs. For example, in the case of wireless communication system 300, the joint grant would include a first resource assignment for transmission of data via a first communication link 325 between the base station 310 and the relay UE 330 (FIG. 3) or between the base station 1210 and the UE 1220 (FIG. 12), and a second resource assignment for transmission of data via a second communication link between the relay UE 330 and the UE 320 (FIG. 3) or between the UE 1220 and the relay UE 1230 (FIG. 12). With regard to wireless communication systems 800 and 1000, the corresponding joint grants would include the resource assignments to establish the DL data pipelines 850/860-1 to 860-N and 1050, respectively. The resource assignment and scheduling circuitry 1742 and relay link management 1748 may further be configured to execute resource assignment and scheduling software 1752 and relay link management software 1758 stored in the computer-readable medium 1706 to implement one or more of the functions described herein.

The processor 1704 further includes DL traffic and control generation and transmission circuitry 1744 for transmitting DL data to one or more destination UEs, as described herein. For example, with regard to wireless communication system 300, the DL traffic and control generation and transmission circuitry 1744 of base station 310 would control the transmission of DL data to the UE 320 via the DL data pipeline 350. With regard to wireless communication system 800, the DL traffic and control generation and transmission circuitry 1744 of base station 310 would control the transmission of DL data to the UE 820 and 840-1 to 840-N via the DL data pipelines 850 and 860-1 to 860-N, respectively. With regard to wireless communication system 1000, the DL traffic and control generation and transmission circuitry 1744 of base station 1010 would control the transmission of DL data to the UE 1020 via the DL data pipeline 1050. The DL traffic and control channel and transmission circuitry 1744 may further be configured to execute DL traffic and control channel reception and processing software 1754 stored in the computer-readable medium 1706 to implement one or more of the functions described herein.

The processor 1704 may further include uplink (UL) traffic and control channel reception and processing circuitry 1746, configured to receive and process uplink control channels and uplink traffic channels from one or more UEs. For example, with regard to the wireless communication system 1200, the UL traffic and control channel reception and processing circuitry 1746 may be configured to receive uplink (UL) data from the UE 1220 and from the relay UE 1230 (the relay UE 1230 may have received the UL data from the UE 1220). The UL traffic and control channel reception and processing circuitry 1746 may further be configured to receive uplink control information (UCI) or uplink user data traffic from one or more UEs. In addition, the UL traffic and control channel reception and processing circuitry 1746 may operate in coordination with the resource assignment and scheduling circuitry 1742 to schedule UL user data traffic transmissions, DL user data traffic transmissions and/or DL user data traffic retransmissions in accordance with the received UCI.

In some examples, the UL traffic and control channel reception and processing circuitry 1746 may be configured to receive a relay node switch message from a source relay UE indicating that a remote UE served by the source relay UE is switching from the source relay UE to another neighbor relay UE to relay information between the remote UE and the base station 1700. In some examples, the relay node switch message may further include the latency requirement for performing the relay node switch. The UL traffic and control channel reception and processing circuitry 1746 may further be configured to receive information (control and/or data) originated by the remote UE from the source relay UE. The UL traffic and control channel reception and processing circuitry 1746 may further be configured to execute UL traffic and control channel reception and processing software 1756 stored in the computer-readable medium 1706 to implement one or more of the functions described herein.

Figure 18:
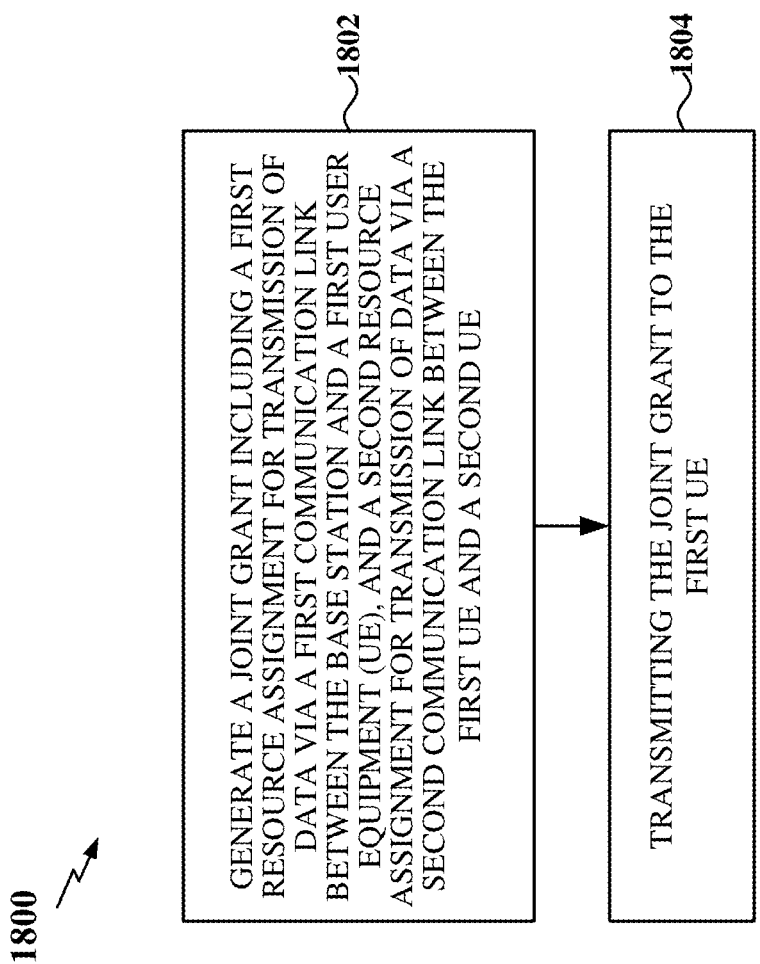
FIG. 18 is a flow diagram of an exemplary method for forming a data pipelines between a user equipment (UE) and one or more relay user equipment (UEs) and/or between the UE and the base station according to some aspects.

FIG. 18 is a flow chart of a method 1800 for wireless communication at a base station. The method 1800 includes the resource assignment and scheduling circuitry 1742 executing the resource assignment and scheduling software 1752 and the relay link management circuitry 1748 executing the relay link management software 1758 to generate a joint grant including a first resource assignment for transmission of data via a first communication link between the base station and a first user equipment (UE), and a second resource assignment for transmission of data via a second communication link between the first UE and a second user equipment (UE). The method 1800 further includes the wireless transceiver 1710 transmitting the joint grant to the first UE (block 1804).

Figure 19:
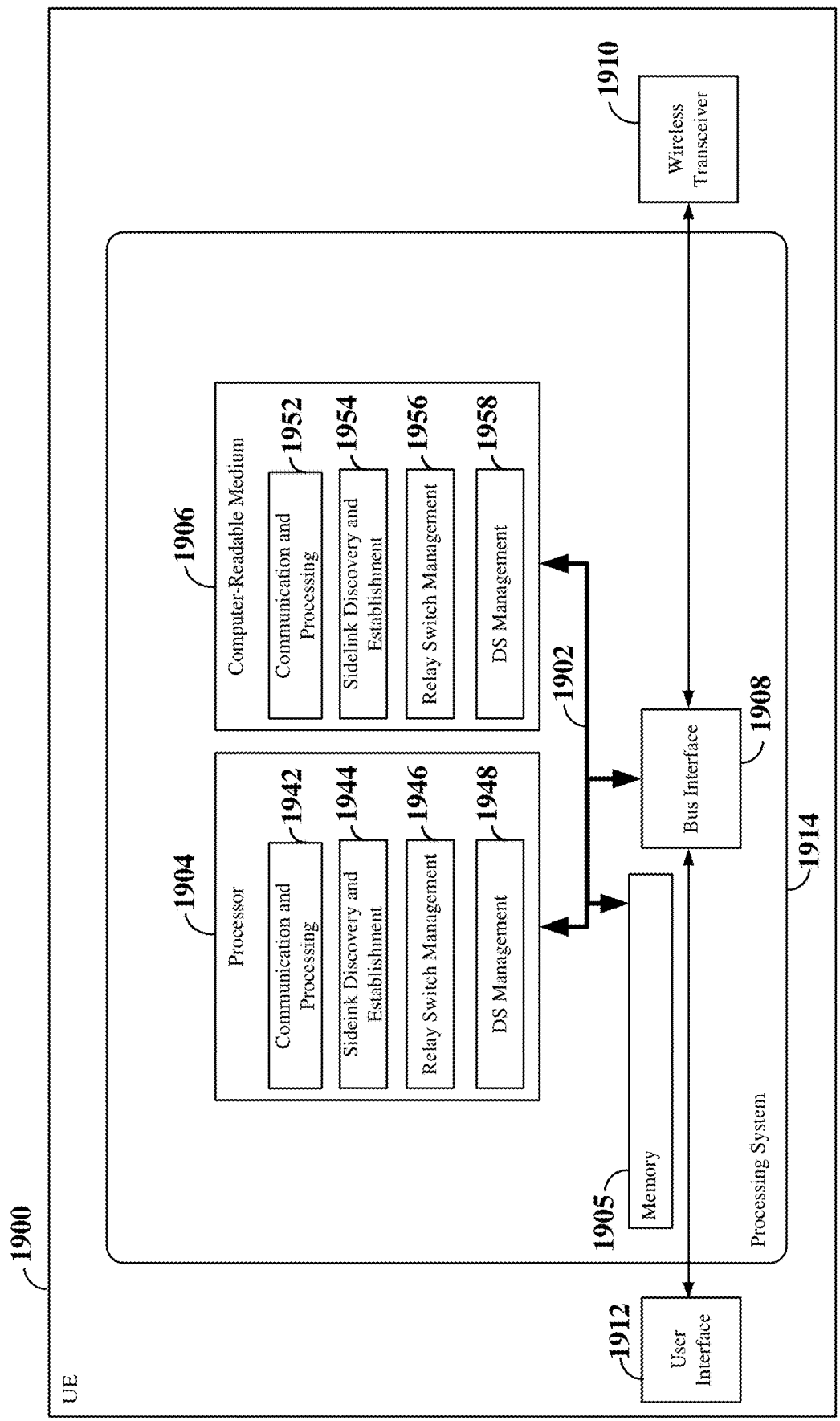
FIG. 19 is a diagram illustrating an example of a hardware implementation for a user equipment (UE) processing system for establishing a data pipeline between a base station and at least one user equipment (UE) and/or between two or more UEs according to some aspects.

FIG. 19 is a block diagram illustrating an example of a hardware implementation for a relay user equipment (UE) 1900 employing a processing system 1914. For example, the relay UE 1900 may correspond to any of the relay UEs previously discussed herein.

The relay UE 1900 may be implemented with a processing system 1914 that includes one or more processors 1904. Examples of processors 1904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the relay UE 1900 may be configured to perform any one or more of the functions described herein. That is, the processor 1904, as utilized in the relay UE 1900, may be used to implement any one or more of the processes and procedures described below.

In this example, the processing system 1914 may be implemented with a bus architecture, represented generally by the bus 1902. The bus 1902 may include any number of interconnecting buses and bridges depending on the specific application of the processing system 1914 and the overall design constraints. The bus 1902 links together various circuits including one or more processors (represented generally by the processor 1904), memory 1905, and computer-readable media (represented generally by the computer-readable medium 1906). The bus 1902 may also link various other circuits such as timing sources, peripherals, voltage regulators, and power management circuits, which are well known in the art, and therefore, will not be described any further.

A bus interface 1908 provides an interface between the bus 1902 and a wireless transceiver 1910. The wireless transceiver 1910 allows for the relay UE 1900 to communicate with various other apparatus over a transmission medium (e.g., air interface). Depending upon the nature of the apparatus, a user interface 1912 (e.g., keypad, display, touch screen, speaker, microphone, control knobs, etc.) may also be provided. Of course, such a user interface 1912 is optional, and may be omitted in some examples.

The processor 1904 is responsible for managing the bus 1902 and general processing, including the execution of software stored on the computer-readable medium 1906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1904, causes the processing system 1914 to perform the various functions described below for any particular apparatus. The computer-readable medium 1906 and the memory 1905 may also be used for storing data that is manipulated by the processor 1904 when executing software.

The computer-readable medium 1906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1906 may reside in the processing system 1914, external to the processing system 1914, or distributed across multiple entities including the processing system 1914. The computer-readable medium 1906 may be embodied in a computer program product. By way of example, a computer program product may include a computer-readable medium in packaging materials. In some examples, the computer-readable medium 1906 may be part of the memory 1905. Those skilled in the art will recognize how best to implement the described functionality presented throughout this disclosure depending on the particular application and the overall design constraints imposed on the overall system.

In some aspects of the disclosure, the processor 1904 may include circuitry configured for various functions. For example, the processor 1904 may include communication and processing circuitry 1942 configured to process a joint grant received from a base station as previously discussed. The communication and processing circuitry 1942 may further be configured to execute communication and processing software 1952 stored in the computer-readable medium 1906 to implement one or more of the functions described herein.

The processor 1904 may also include a sidelink discovery and establishment circuitry 1944 configured to discover one or more destination UEs to which downlink data is to be sent, and establish one or more communication links to the one or more destination UEs, respectively. The sidelink discovery and establishment circuitry 1944 may further be configured to execute sidelink discovery and establishment software 1954 stored in the computer-readable medium 1906 to implement one or more of the functions described herein.

The processor 1904 may include a relay switch management circuitry 1946 configured to operate as a relay node based on the joint grant, and perform the relaying of the DL data received a base station via the one or more communication links and relay the DL data to one or more destination UEs via one or more sets of communication links, respectively. The relay switch management circuitry 1946 may further be configured to execute relay switch management 1946 software 1956 stored in the computer-readable medium 1906 to implement one or more of the functions described herein.

The processor 1904 may include a discovery signal (DS) management 1948 configured to discover the one or more destination UEs for DL data relaying purposes via created one or more data pipelines. The discovery signal (DS) management 1948 may further be configured to execute discovery signal (DS) management software 1958 stored in the computer-readable medium 1906 to implement one or more of the functions described herein.

Figure 20:
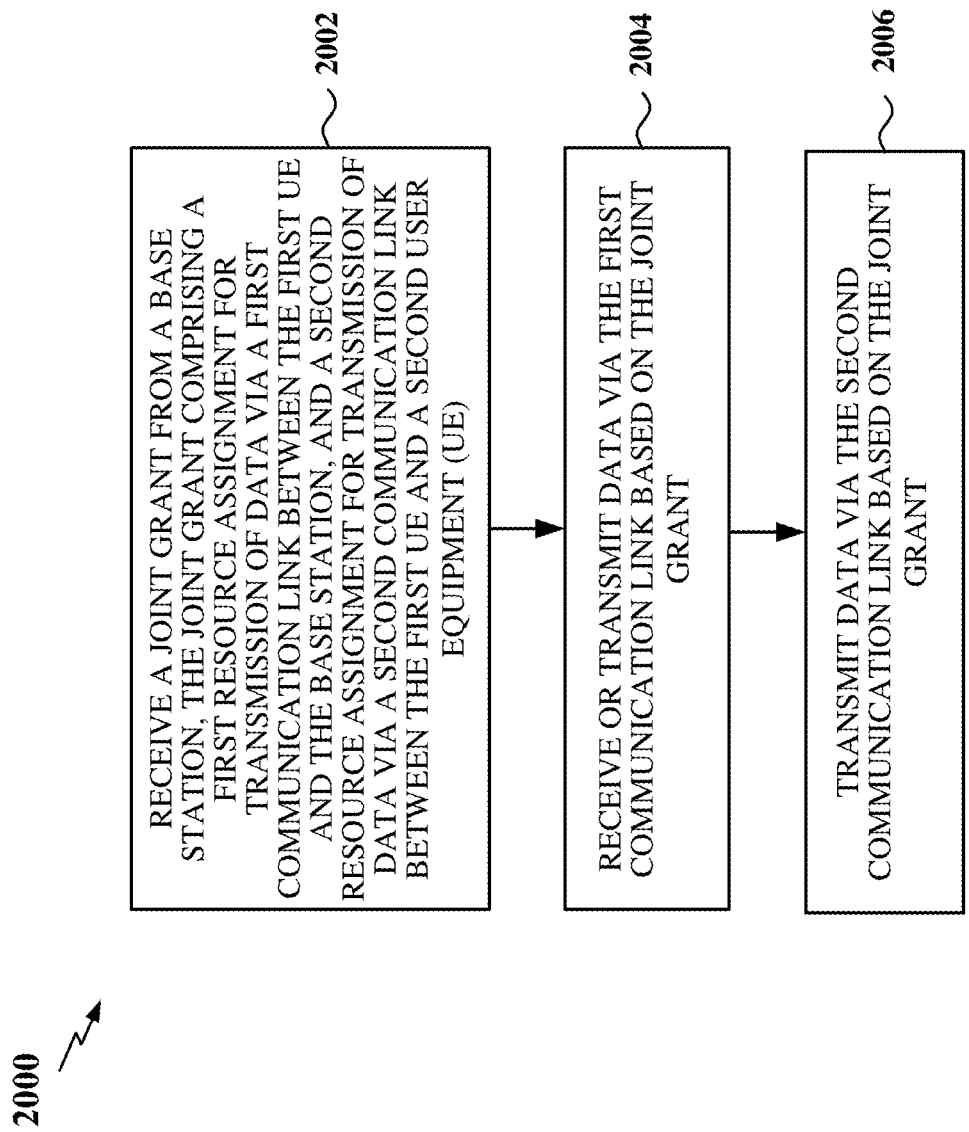
FIG. 20 is a flow diagram of an exemplary method for forming a data pipeline between a user equipment (UE) and one or more relay user equipment (UE) and/or between the UE and the base station according to some aspects.

FIG. 20 is a flow chart of a method 2000 for wireless communication at a base station. The method 2000 includes the communication and processing circuitry 1942 executing the communication and processing software 1952 to receive a joint grant from a base station, the joint grant comprising a first resource assignment for transmission of data via a first communication link between the base station and a first UE, and a second resource assignment for transmission of data via a second communication link between the first UE and a second user equipment (UE) (block 2002). The method 2000 further includes the relay switch management circuitry 1946 to execute the relay switch management software 1956 receive or transmit data via the first communication link based on the joint grant (block 2004). Additionally, the method 2000 includes the sidelink discovery and establishment circuitry 1944 executing the relay link discovery and establishment software 1954 to transmit the data via the second communication link based on the joint grant (block 2006).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4, 8, 10, 12, and 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspect of the present disclosure:

Aspect 1: A base station including: a processor; a wireless transceiver communicatively coupled to the processor; and a memory communicatively coupled to the processor, wherein the processor and the memory are configured to: generate a joint grant including a first resource assignment for transmission of data via a first communication link between the base station and a first user equipment (UE), and a second resource assignment for transmission of data via a second communication link between the first UE and a second UE; and transmit the joint grant to the first UE via the wireless transceiver.

Aspect 2: The base station of aspect 1, wherein the processor and the memory are configured to transmit the data to the first UE via the wireless transceiver for relaying to the second UE based on the joint grant.

Aspect 3: The base station of aspect 1, wherein the processor and the memory are configured to receive the data from the first UE via the wireless transceiver based on the joint grant.

Aspect 4: The base station of aspect 1 or 3, wherein the processor and the memory are configured to receive the data from the second UE via the wireless transceiver based on the joint grant, the second UE being configured to relay the data on behalf of the first UE.

Aspect 5: The base station of any one of aspect 1, 3 or 4, wherein the joint grant further includes a third resource assignment for transmission of data via a third communication link between the first UE and a third UE, the third UE being configured to receive the data from the first UE for relaying to the base station based on the third resource assignment.

Aspect 6: The base station of any one of aspect 1-5, wherein the joint grant further includes a set of one or more resource assignments for transmission of data via a set of one or more communication links between the first UE and a set of one or more other user equipment (UEs), respectively, wherein the first communication link is in series with the set of one or more communication links forming a set of one or more pipelines for transmitting data between the base station and the set of one or more other UEs, respectively, wherein the first UE is configured to relay the data between the base station and the set of one or more other UEs in accordance with the joint grant, respectively.

Aspect 7: The base station of any one of aspect 1-6, wherein the joint grant further includes a set of one or more resource assignments for transmission of data via a set of one or more cascaded communication links between the base station and the first UE via a set of one or more other UEs, respectively, wherein the set of one or more other UEs are configured to relay the data between the base station and the first UE.

Aspect 8: A method for wireless communication at a base station, the method including: generating a joint grant including a first resource assignment for transmission of data via a first communication link between the base station and a first user equipment (UE), and a second resource assignment for transmission of data via a second communication link between the first UE and a second UE; and transmitting the joint grant to the first UE.

Aspect 9: The method of aspect 8, further including transmitting the data to the first UE via the first communication link for relaying to the second UE based on the joint grant.

Aspect 10: The method of aspect 8, further including receiving the data from the first UE via the first communication link based on the joint grant.

Aspect 11: The method of aspect 8 or 10, further including receiving the data from the second UE based on the joint grant, the second UE relaying the data on behalf of the first UE.

Aspect 12: The method of any one of aspect 8, 10 or 11, wherein the joint grant further includes a third resource assignment for transmission of data via a third communication link between the first UE and a third UE, the third UE receiving the data from the first UE for relaying to the base station based on the third resource assignment.

Aspect 13: The method of any one of aspect 8-12, wherein the joint grant further includes a set of one or more resource assignments for transmission of data via a set of one or more communication links between the first UE and a set of one or more other user equipment (UEs), respectively, wherein the first communication link is in series with the set of one or more communication links forming a set of one or more pipelines for transmitting data between the base station and the set of one or more other UEs, respectively, wherein the first UE relays the data between the base station and the set of one or more other UEs in accordance with the joint grant, respectively.

Aspect 14: The method of any one of aspect 8-13, wherein the joint grant further includes a set of one or more resource assignments for transmission of data via a set of one or more cascaded communication links between the base station and the first UE via a set of one or more other UEs, respectively, wherein the set of one or more other UEs relays the data between the base station and the first UE.

Aspect 15: A first user equipment (UE), including: a processor; a wireless transceiver communicatively coupled to the processor; and a memory communicatively coupled to the processor, wherein the processor and the memory are configured to: receive a joint grant from a base station via the wireless transceiver, the joint grant including a first resource assignment for transmission of data via a first communication link between the first UE and the base station, and a second resource assignment for transmission of data via a second communication link between the first UE and a second user equipment (UE); receive or transmit data via the first communication link and the wireless transceiver based on the joint grant; and transmit data via the second communication link and the wireless transceiver based on the joint grant.

Aspect 16: The first UE of aspect 15, wherein the data includes downlink data, and wherein the processor and the memory are configured to: receive the downlink data from the base station via the first communication link and the wireless transceiver based on the joint grant; and relay the downlink data to the second UE via the second communication link and the wireless transceiver based on the joint grant.

Aspect 17: The first UE of aspect 15, wherein the data includes uplink data, and wherein the processor and the memory are configured to transmit the uplink data to the base station via the wireless transceiver and the first communication link based on the joint grant.

Aspect 18: The first UE of aspect 15 or 17, wherein the data includes uplink data, and wherein the processor and the memory are configured to transmit the uplink data to the second UE via the wireless transceiver and the second communication link based on the joint grant, the second UE being configured to relay the data to the base station.

Aspect 19: The first UE of any one of aspect 15, 17, or 18, wherein the joint grant further includes a third resource assignment for transmission of data via a third communication link between the first UE and a third user equipment (UE).

Aspect 20: The first UE of aspect 19, wherein the processor and the memory are configured to transmit the data to the third UE via the wireless transceiver and the third communication link based on the joint grant, the third UE being configured to relay the data to the base station.

Aspect 21: The first UE of any one of aspect 15-20, wherein the joint grant further includes a set of one or more resource assignments for transmission of data via a set of one or more communication links between the first UE and a set of one or more other user equipment (UEs), respectively, wherein the first communication link is in series with the set of one or more communication links forming a set of one or more pipelines for transmitting data to the set of one or more other UEs, respectively, the first UE being configured to relay the data between the base station and the set of one or more other UEs.

Aspect 22: The first UE of any one of aspect 15-21, wherein the joint grant further includes a set of one or more resource assignments for transmission of data via a set of one or more cascaded communication links between the base station and the first UE via a set of one or more other relay UEs, respectively, the set of one or more other relays UEs being configured to relay the data between the base station and the first UE.

Aspect 23: A method for wireless communication at a first user equipment (UE), the method including: receiving a joint grant from a base station, the joint grant including a first resource assignment for transmission of data via a first communication link between the first UE and the base station, and a second resource assignment for transmission of data via a second communication link between the first UE and a second user equipment (UE); receiving or transmitting data via the first communication link based on the joint grant; and transmitting data via the second communication link based on the joint grant.

Aspect 24: The method of aspect 23, wherein receiving or transmitting data includes receiving downlink data from the base station via the first communication link based on the joint grant, and wherein transmitting data includes relaying the downlink data to the second UE via the second communication link based on the joint grant.

Aspect 25: The method of aspect 23, wherein receiving or transmitting data includes transmitting uplink data to the base station via the first communication link based on the joint grant.

Aspect 26: The method of aspect 23 or 25, wherein transmitting data includes transmitting uplink data to the second UE via the second communication link based on the joint grant, the second UE relaying the uplink data to the base station.

Aspect 27: The method of any one of aspect 23, 25, or 26, wherein the joint grant further includes a third resource assignment for transmission of data via a third communication link between the first UE and a third user equipment (UE).

Aspect 28: The method of aspect 27, further including transmitting transmit the data to the third UE via the third communication link based on the joint grant, the third UE relaying the data to the base station.

Aspect 29: The method of any one of aspect 23-28, wherein the joint grant further including a set of one or more resource assignments for transmission of data via a set of one or more communication links between the first UE and a set of one or more other user equipment (UEs), respectively, wherein the first communication link is in series with the set of one or more communication links forming a set of one or more pipelines for transmitting data between the base station and the set of one or more other UEs, respectively, the first UE relaying the data between the base station and the set of one or more other UEs.

Aspect 30: The method of any one of aspect 23-29, wherein the joint grant further includes a set of one or more resource assignments for transmission of data via a set of one or more cascaded communication links between the base station and the first UE via a set of one or more other relay UEs, respectively, the set of one or more other relays UEs relaying the data between the base station and the first UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A base station, comprising:
   a processor;
   a wireless transceiver communicatively coupled to the processor; and
   a memory communicatively coupled to the processor, wherein the processor and the memory are configured to:
   generate a joint grant comprising a first resource assignment for transmission of data via a first communication link between the base station and a first user equipment (UE), a second resource assignment for transmission of data via a second communication link between the first UE and a second UE, and a set of one or more resource assignments for transmission of data via a set of one or more communication links between the first UE and a set of one or more other user equipment (UEs), respectively; and
   transmit the joint grant to the first UE via the wireless transceiver.

2. The base station of claim 1, wherein the processor and the memory are configured to transmit the data to the first UE via the wireless transceiver for relaying to the second UE based on the joint grant.

3. The base station of claim 1, wherein the processor and the memory are configured to receive the data from the first UE via the wireless transceiver based on the joint grant.

4. The base station of claim 1, wherein the processor and the memory are configured to receive the data from the second UE via the wireless transceiver based on the joint grant, the second UE being configured to relay the data on behalf of the first UE via a communication link setup between the base station and the second UE.

5. The base station of claim 1, wherein the set of one or more other UEs is configured to receive the data from the first UE for relaying to the base station based on the set of one or more resource assignments, respectively.

6. The base station of claim 1, wherein the first communication link is in series with the set of one or more communication links forming a set of one or more pipelines for transmitting data between the base station and the set of one or more other UEs, respectively, wherein the first UE is configured to relay the data between the base station and the set of one or more other UEs in accordance with the joint grant, respectively.

7. The base station of claim 1, wherein the set of one or more communications link comprises a set of one or more cascaded communication links between the base station and the first UE via the set of one or more other UEs, respectively, wherein the set of one or more other UEs are configured to relay the data between the base station and the first UE.

8. A method for wireless communication at a base station, the method comprising:

generating a joint grant comprising a first resource assignment for transmission of data via a first communication link between the base station and a first user equipment (UE), a second resource assignment for transmission of data via a second communication link between the first UE and a second UE, and a set of one or more resource assignments for transmission of data via a set of one or more communication links between the first UE and a set of one or more other user equipment (UEs), respectively; and transmitting the joint grant to the first UE.

9. The method of claim 8, further comprising transmitting the data to the first UE via the first communication link for relaying to the second UE based on the joint grant.

10. The method of claim 8, further comprising receiving the data from the first UE via the first communication link based on the joint grant.

11. The method of claim 8, further comprising receiving the data from the second UE based on the joint grant, the second UE relaying the data on behalf of the first UE via a communication link setup between the base station and the second UE.

12. The method of claim 8, wherein the set of one or more other UEs receives the data from the first UE for relaying to the base station based on the set of one or more resource assignments, respectively.

13. The method of claim 8, wherein the first communication link is in series with the set of one or more communication links forming a set of one or more pipelines for transmitting data between the base station and the set of one or more other UEs, respectively, wherein the first UE relays the data between the base station and the set of one or more other UEs in accordance with the joint grant, respectively.

14. The method of claim 8, wherein the set of one or more communications link comprises a set of one or more cascaded communication links between the base station and the first UE via the set of one or more other UEs, respectively, wherein the set of one or more other UEs relays the data between the base station and the first UE.

15. A first user equipment (UE), comprising:
a processor;
a wireless transceiver communicatively coupled to the processor; and
a memory communicatively coupled to the processor, wherein the processor and the memory are configured to:
receive a joint grant from a base station via the wireless transceiver, the joint grant comprising a first resource assignment for transmission of data via a first communication link between the first UE and the base station, a second resource assignment for transmission of data via a second communication link between the first UE and a second user equipment (UE), and a set of one or more resource assignments for transmission of data via a set of one or more communication links between the first UE and a set of one or more other user equipment (UEs), respectively;
receive or transmit data via the first communication link and the wireless transceiver based on the joint grant; and
transmit data via the second communication link and the wireless transceiver based on the joint grant.

16. The first UE of claim 15, wherein the data comprises downlink data, and wherein the processor and the memory are configured to:

receive the downlink data from the base station via the first communication link and the wireless transceiver based on the joint grant; and
relay the downlink data to the second UE via the second communication link and the wireless transceiver based on the joint grant.

17. The first UE of claim 15, wherein the data comprises uplink data, and wherein the processor and the memory are configured to transmit the uplink data to the base station via the wireless transceiver and the first communication link based on the joint grant.

18. The first UE of claim 15, wherein the data comprises uplink data, and wherein the processor and the memory are configured to transmit the uplink data to the second UE via the wireless transceiver and the second communication link based on the joint grant, the second UE being configured to relay the data to the base station via a communication link setup between the base station and the second UE.

19. The first UE of claim 15, wherein the processor and the memory are configured to transmit the data to the set of one or more other UEs via the wireless transceiver and the set of one or more communication links based on the joint grant, the set of one or more other UEs being configured to relay the data to the base station.

20. The first UE of claim 15, wherein the first communication link is in series with the set of one or more communication links forming a set of one or more pipelines for transmitting data to the set of one or more other UEs, respectively, the first UE being configured to relay the data between the base station and the set of one or more other UEs.

21. The first UE of claim 15, wherein the set of one or more communications link comprises a set of one or more cascaded communication links between the base station and the first UE via the set of one or more other UEs, respectively, the set of one or more other UEs being configured to relay the data between the base station and the first UE.

22. A method for wireless communication at a first user equipment (UE), the method comprising:
receiving a joint grant from a base station, the joint grant comprising a first resource assignment for transmission of data via a first communication link between the first UE and the base station, a second resource assignment for transmission of data via a second communication link between the first UE and a second user equipment (UE), and a set of one or more resource assignments for transmission of data via a set of one or more communication links between the first UE and a set of one or more other user equipment (UEs), respectively;
receiving or transmitting data via the first communication link based on the joint grant; and
transmitting data via the second communication link based on the joint grant.

23. The method of claim 22, wherein receiving or transmitting data comprises receiving downlink data from the base station via the first communication link based on the joint grant, and wherein transmitting data comprises relaying the downlink data to the second UE via the second communication link based on the joint grant.

24. The method of claim 22, wherein receiving or transmitting data comprises transmitting uplink data to the base station via the first communication link based on the joint grant.

25. The method of claim 22, wherein transmitting data comprises transmitting uplink data to the second UE via the second communication link based on the joint grant, the second UE relaying the uplink data to the base station via a communication link setup between the base station and the second UE.

26. The method of claim 22, further comprising transmitting the data to the set of one or more other UEs via the set of one or more communication links based on the joint grant, the set of one or more other UEs relaying the data to the base station.

27. The method of claim 22, wherein the first communication link is in series with the set of one or more communication links forming a set of one or more pipelines for transmitting data between the base station and the set of one or more other UEs, respectively, the first UE relaying the data between the base station and the set of one or more other UEs.

28. The method of claim 22, wherein the set of one or more communications link comprises a set of one or more cascaded communication links between the base station and the first UE via the set of one or more other UEs, respectively, the set of one or more other UEs relaying the data between the base station and the first UE.

* * * * *